(12) United States Patent
Greene

(10) Patent No.: US 7,809,195 B1
(45) Date of Patent: Oct. 5, 2010

(54) ENCODING SYSTEM PROVIDING DISCRIMINATION, CLASSIFICATION, AND RECOGNITION OF SHAPES AND PATTERNS

(76) Inventor: Ernest Greene, 10550 Pine Hill Dr., Sunland, CA (US) 91040

( * ) Notice: Subject to any disclaimer, the term of this patent is extended or adjusted under 35 U.S.C. 154(b) by 0 days.

(21) Appl. No.: 12/251,340

(22) Filed: Oct. 14, 2008

Related U.S. Application Data

(63) Continuation-in-part of application No. 12/233,381, filed on Sep. 18, 2008, now abandoned.

(51) Int. Cl.
*G06K 9/00* (2006.01)

(52) U.S. Cl. ........................................ 382/181; 707/713

(58) Field of Classification Search ................. 382/100, 382/181, 190, 195, 206, 224, 225, 232, 243, 382/244, 245; 707/1, 708, 713; 341/51
See application file for complete search history.

(56) References Cited

U.S. PATENT DOCUMENTS

| | | | | |
|---|---|---|---|---|
| 5,929,980 | A * | 7/1999 | Yamaguchi et al. | 356/4.03 |
| 6,052,483 | A * | 4/2000 | Baird et al. | 382/190 |
| 6,628,821 | B1 * | 9/2003 | Covell et al. | 382/155 |
| 6,687,401 | B2 * | 2/2004 | Naoi et al. | 382/190 |
| 6,850,645 | B2 * | 2/2005 | Naoi et al. | 382/190 |
| 7,693,683 | B2 * | 4/2010 | Ihara | 702/179 |
| 2005/0063579 | A1 * | 3/2005 | Lee et al. | 382/131 |
| 2005/0111713 | A1 * | 5/2005 | Jerebko | 382/128 |
| 2006/0008150 | A1 * | 1/2006 | Zhao et al. | 382/190 |
| 2006/0110029 | A1 * | 5/2006 | Kazui et al. | 382/159 |
| 2007/0183663 | A1 * | 8/2007 | Wang et al. | 382/173 |

\* cited by examiner

*Primary Examiner*—Anand Bhatnagar

(57) ABSTRACT

My system provides summaries of shapes and patterns that are manifested by the states of an array of elements, and methods for comparing them for correspondence. A very basic embodiment provides these summaries in the following manner. The array provides a Cartesian coordinate system address for each element. Each element of the array is polled, and if the element is part of the pattern, described here as being marked, it delivers its address to a processor. The processor calculates the distance from each marked element to a central location, described as a convergence hub, and delivers these distance values to a distributor. The distributor provides a summary distribution, which specifies the number of times a given distance was observed (or numerical adjustments thereof). This distribution is stored and used for comparison against alternative distributions, which provides a basis for assessing similarity or difference among various shapes and patterns.

32 Claims, 23 Drawing Sheets

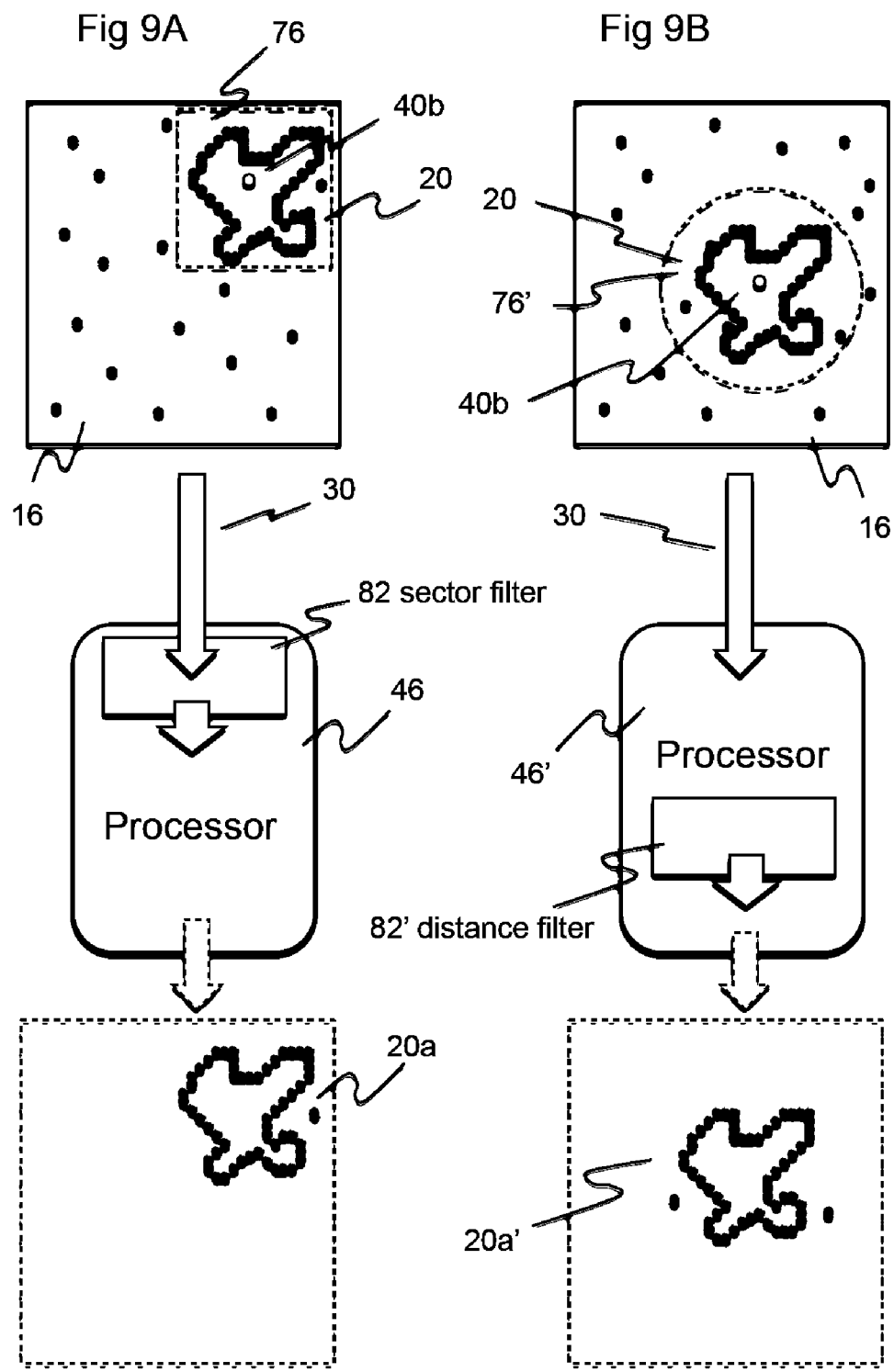

Fig 10A
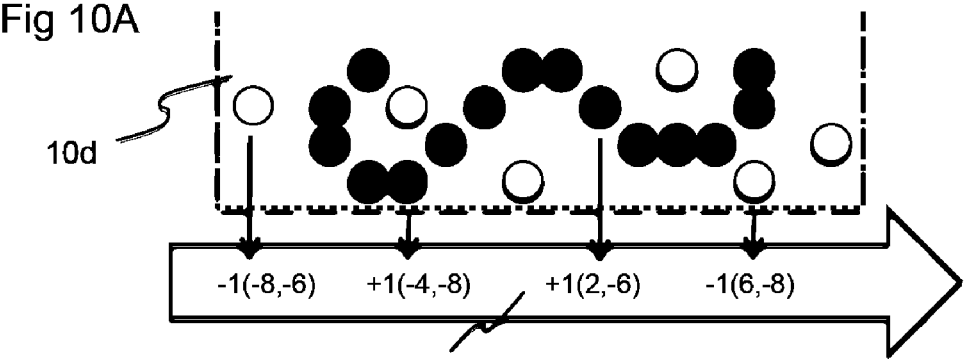
Fig 10B
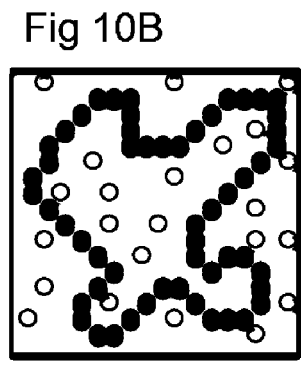
Fig 10C
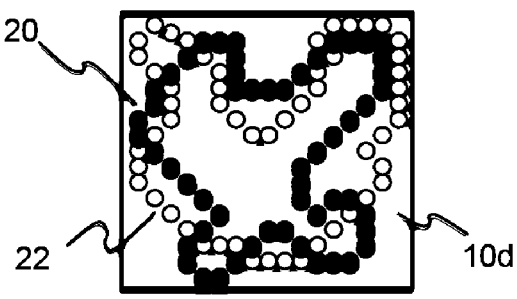
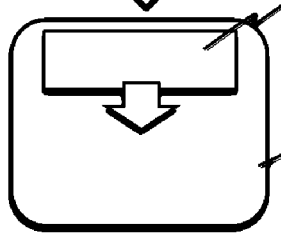
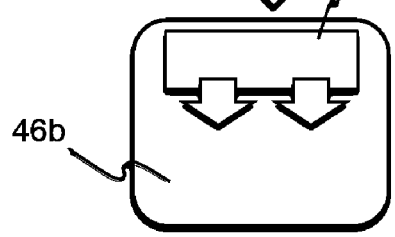
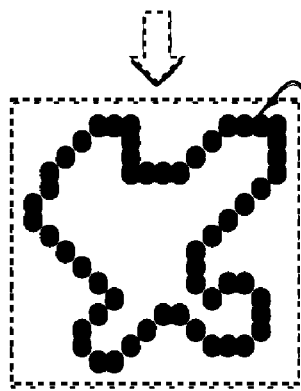
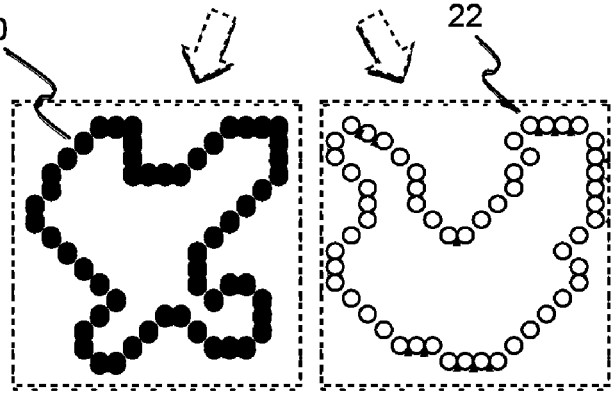

Fig. 13A
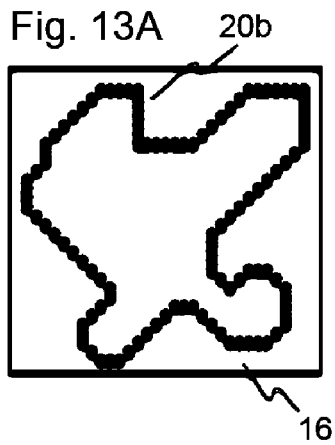 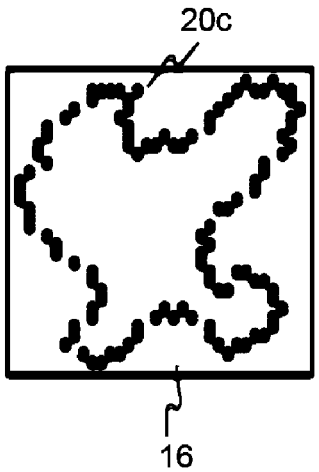 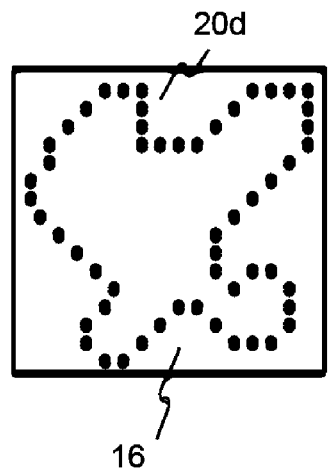
Fig. 13B
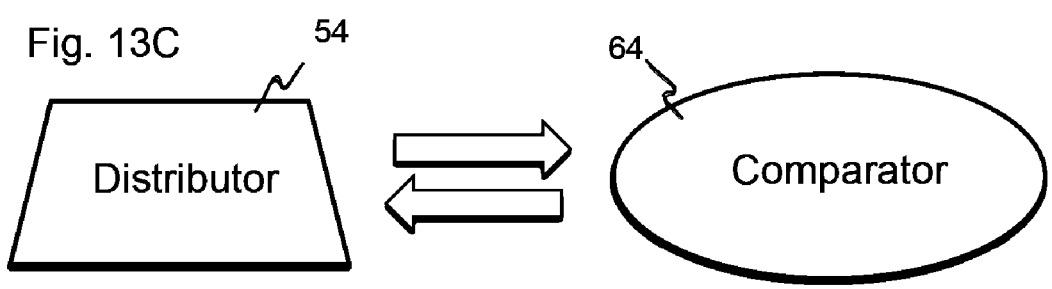
Fig. 13C
Distributor ⇄ Comparator
Fig. 13D
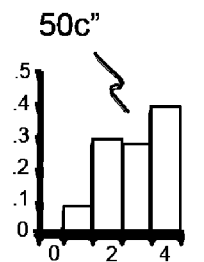 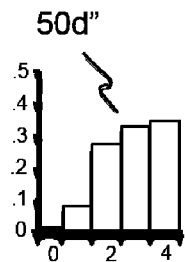 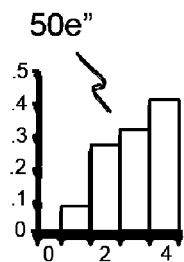

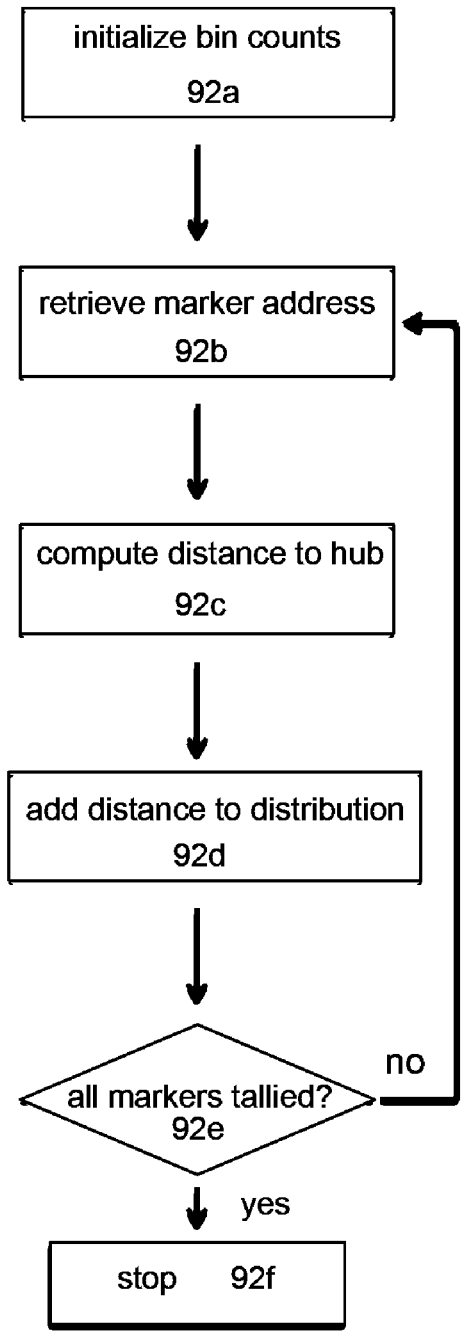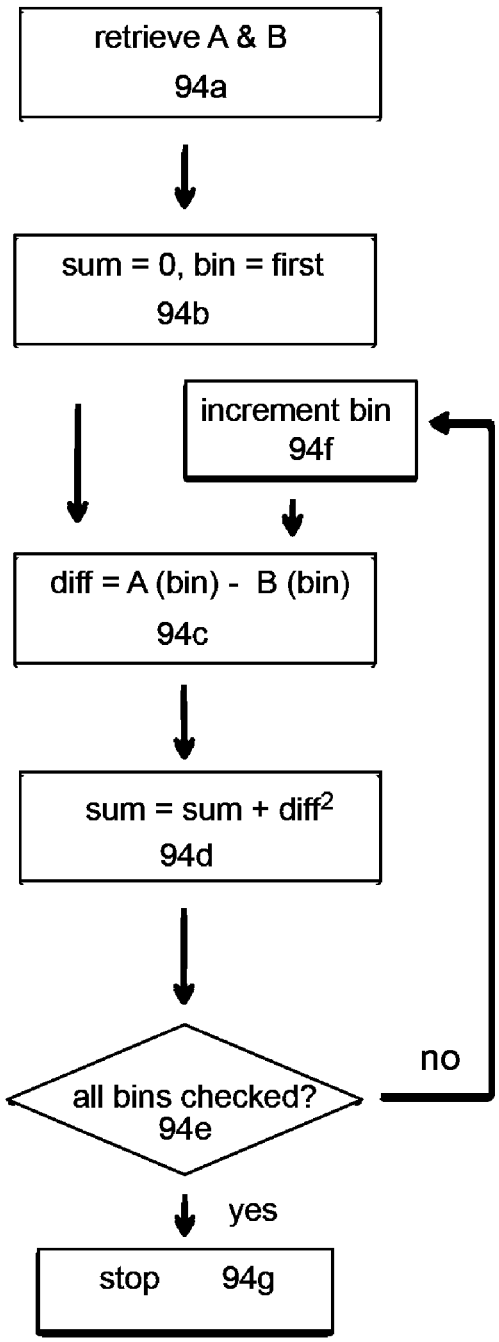
Fig. 16A
Fig. 16B

Fig. 18A
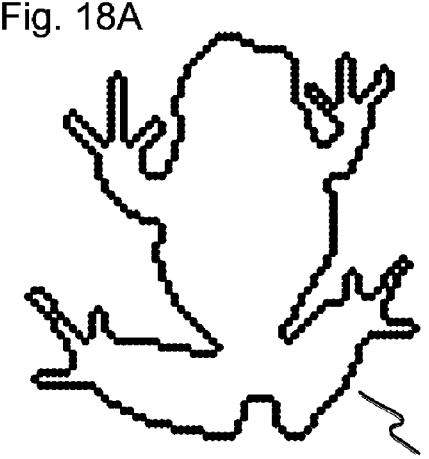
24a
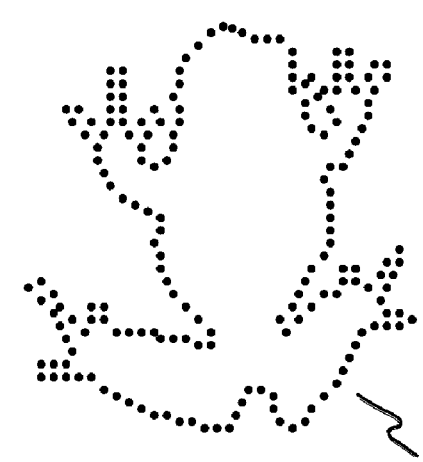
24a'
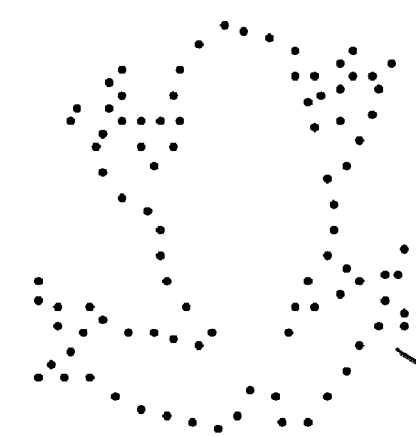
24a"
Fig. 18B
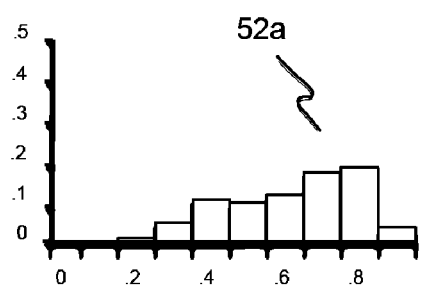
52a
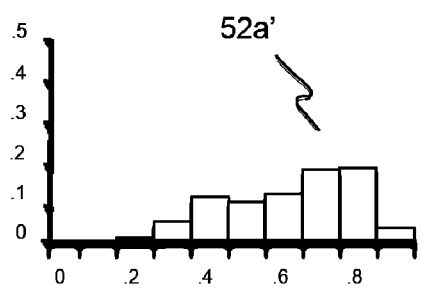
52a'
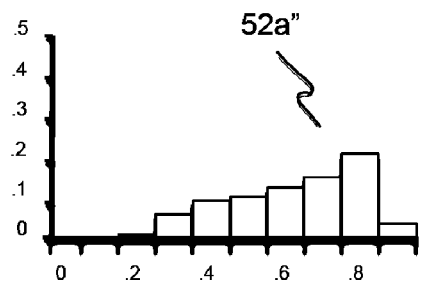
52a"

ENCODING SYSTEM PROVIDING DISCRIMINATION, CLASSIFICATION, AND RECOGNITION OF SHAPES AND PATTERNS

CROSS-REFERENCE TO RELATED APPLICATION

This is a Continuation-in-Part of Application Ser. No. 12/233,381, filed Sep. 18, 2008, now abandoned.

BACKGROUND

1. Field

This system provides quantitative methods for summarizing, discriminating, classifying, and/or recognizing shapes and patterns, which will be useful for quality control in the manufacturing of objects, robotic vision, and navigation of vehicles.

2. Prior Art

Machines are known that can distinguish among shapes and patterns, such as for quality control in manufacturing, robotic vision, navigation of vehicles, and registration of differentials of brightness and/or color using a two-dimensional electronic array. The state of each element within the array, such as its level of brightness, is then analyzed by one of several methods. Most often elaborate "segmentation" procedures are used. These break the shape or pattern into its component "features," which are analyzed individually and then collectively. For an overview, see Image Analysis: Problems, Progress and Prospects, A. Rosenfeld, Pattern Recognition, 17, 3-12 (1984).

U.S. Pat. No. 4,845,764 (1989) to Ueda et al. (1989) and U.S. Pat. No. 5,546,476 (1996) to Mitaka et al. are typical. Each shows a system which recognizes objects by their alignments and spacing in the value pattern that corresponds to the lines and edges of the object. Similarly, U.S. Pat. No. 5,434,803 to Yoshida (1995) shows a system which evaluates the degree of roundness, straightness, and other geometric properties that are present in a given shape, and uses these attributes for recognition. The basic strategy for these systems is to measure and build a summary based on the properties of these lines and edges, such as their length, orientation, and degree of curvature. This kind of processing requires complex and time consuming algorithms. Further, these methods fail if the shape or pattern to be identified provides corrupted or minimal information with respect to those attributes.

A major handicap for development of an effective system has been the general belief that the contour's collinear attributes, i.e., length, orientation and curvature, are the essential defining properties of shapes and patterns. By assuming that they are, it becomes necessary to assess length, orientation and curvature of the major contours to derive an effective summary that can be stored and used for recognition.

However, recent work by me, "Recognition of objects displayed with incomplete sets of discrete boundary dots," Perceptual and Motor Skills, 104, 1043-1059 (2007), and "Additional evidence that contour attributes are not essential cues for object recognition," Behavioral and Brain Functions, 2008, 4, 26, has cast doubt on this assumption. My work has shown that humans can recognize a wide range of shapes, e.g., animals, tools, vehicles, and furniture under conditions in which the collinear attributes, such as length, orientation and curvature of the contours, have been severely degraded and are arguably absent. A sparse display of dots that are positioned around the outer boundary of the shape can provide sufficient cues for recognition, and in the works cited I provide evidence that it is even unlikely that the boundary is being mentally reconstructed by connecting the dots.

ADVANTAGES

The system described below, in one embodiment, can be applied to any shape or pattern that is represented as two or more states on an array of image elements. Compared to other methods of shape and pattern encoding, the method is extremely simple. This allows embodiments in which speed, low power consumption and simplicity of circuit design are of prime importance. Further advantages of this and other embodiments will be apparent from the ensuing description.

SUMMARY

According to one aspect, shapes and patterns are encoded by an array of elements. In simplest form, the array has two states, with black being used to mark, i.e., designate, one state and white being used to mark the other. In the examples given below, black markers provide the pattern to be encoded. The distance from each black marker to a convergence hub is determined. In many embodiments this hub will either be the center of the array or the centroid of the pattern. One embodiment can provide a tandem assessment in relation to several hubs. The distances with respect to a given hub are then combined in a distribution. The comparability of various patterns is evaluated by comparing the distributions that are derived by this encoding process, which provides a method for discriminating among alternative shapes and patterns, or affirming correspondence.

DRAWINGS

Figures

FIG. 9A shows a value filter that rejects any addresses that are not within a specified sector, thus encoding only the pattern of markers that fall within the sector.

FIG. 9B shows a value filter that rejects any distances that are beyond a specified range, thus encoding only the pattern of markers that lie within that range.

FIG. 10A shows a portion of a marker array that provides two classes of markers.

FIG. 10B shows a value filter that rejects one class of marker, thus encoding only the pattern of the other class.

FIG. 10C shows a value filter that sorts the two marker classes, thus providing for encoding of the pattern of each class.

FIG. 13A shows three patterns that are judged as similar by a human, even though the pattern in the second and third panels are corrupted and sparse, respectively.

FIG. 13B shows the distributions that will summarize the respective patterns in FIG. 13A.

FIG. 13C shows a distributor and a comparator that are able to iteratively interact to provide rebinning of the distributions shown in FIG. 13B.

FIG. 13D shows distributions provided by rebinning, which have a sum of squared difference that is lower (indicating greater similarity) than for the original distributions shown in FIG. 13B.

FIG. 16A shows the flowchart for deriving a distance distribution

FIG. 16B shows a flowchart for comparing two distributions using SSD

FIG. 18A shows a pattern of markers that is taken as the "known" shape (top), a sparse version of the pattern that provides only 50% of the markers (middle), and a sparse version that provides only 25% of the markers (bottom).

FIG. 18B shows the distributions that summarize the three patterns shown in FIG. 18A.

Figure 20A:
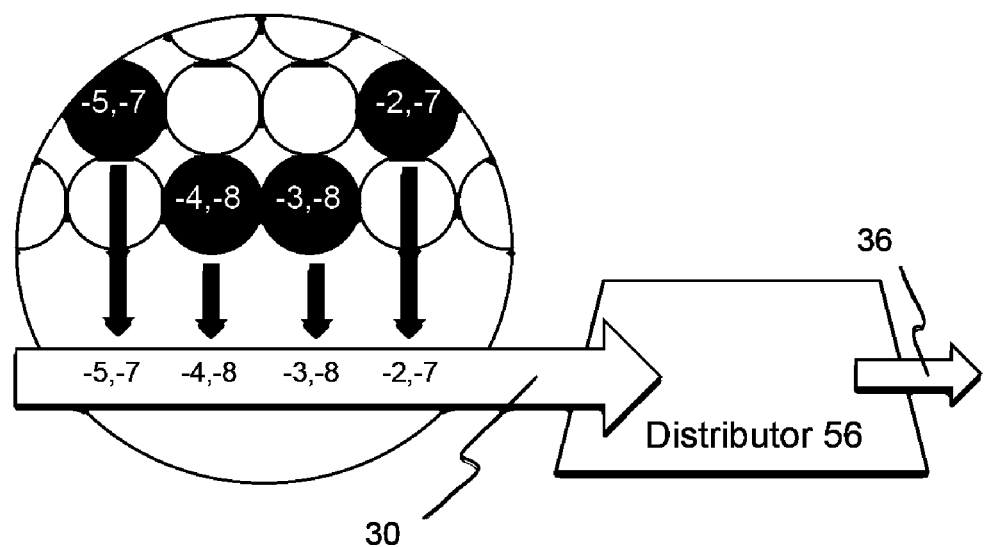
FIG. 20A shows addresses delivered into signal 30 being sorted to separate X and Y components.
Figure 20B:
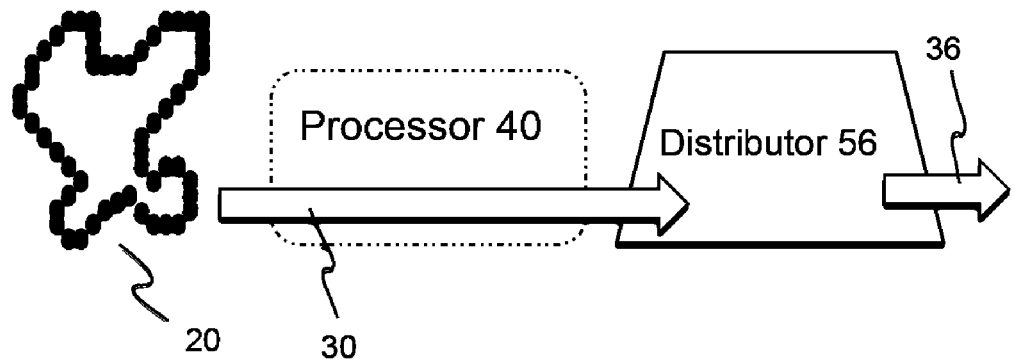

FIG. 20B provides an alternative illustration of the processing, showing that X and Y address values are distributed directly into a summary histogram, thus eliminating any calculation of distance by processor 40.

Figure 20C:
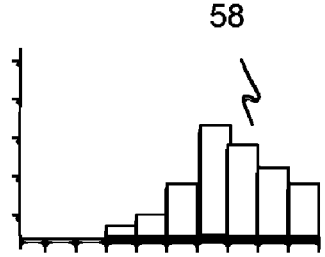

FIG. 20C shows the summary histogram that was derived by distributing address components.

Figure 21A:
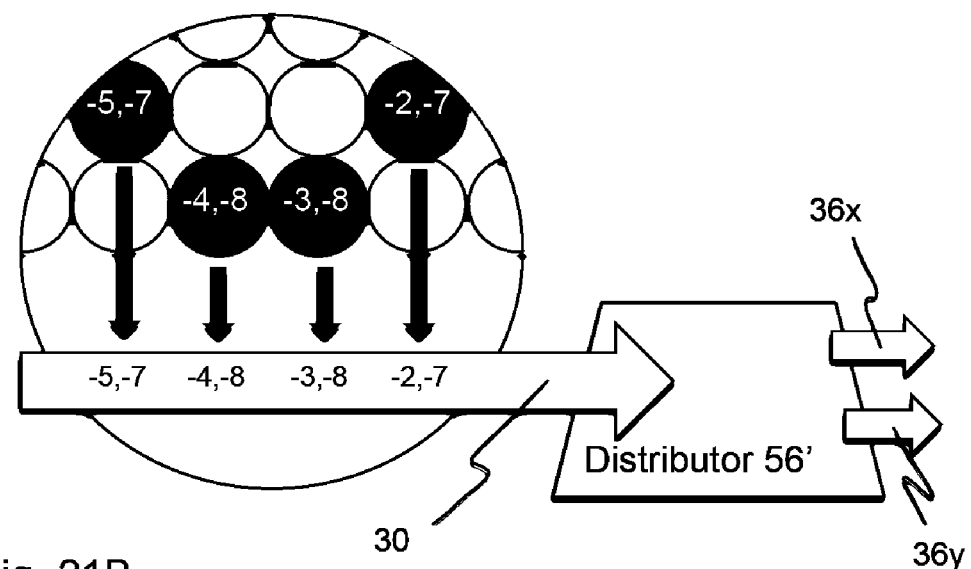

FIG. 21A shows a distributor that can provide a distribution of the X address components, and another for the Y address component.

Figure 21B:
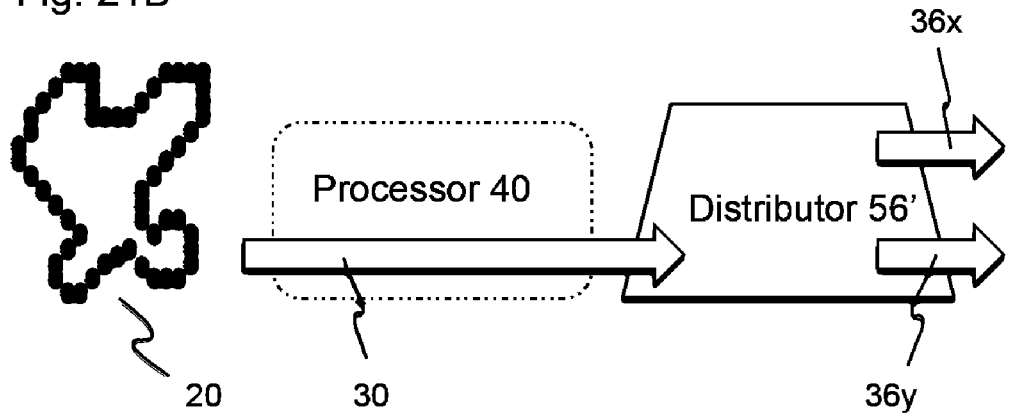

FIG. 21B illustrates that this method also eliminates the need for processor 40.

Figure 21C:
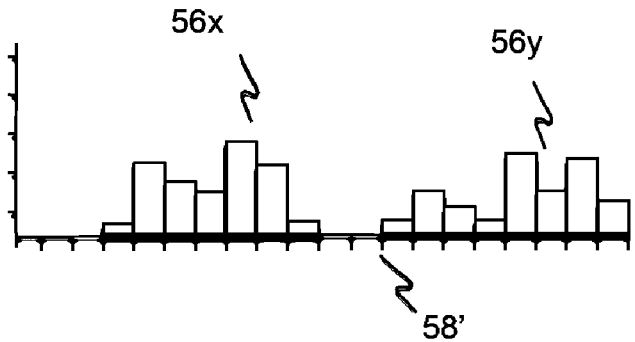

FIG. 21C shows the X and Y distributions being combined to form a summary distribution.

Figure 22A:
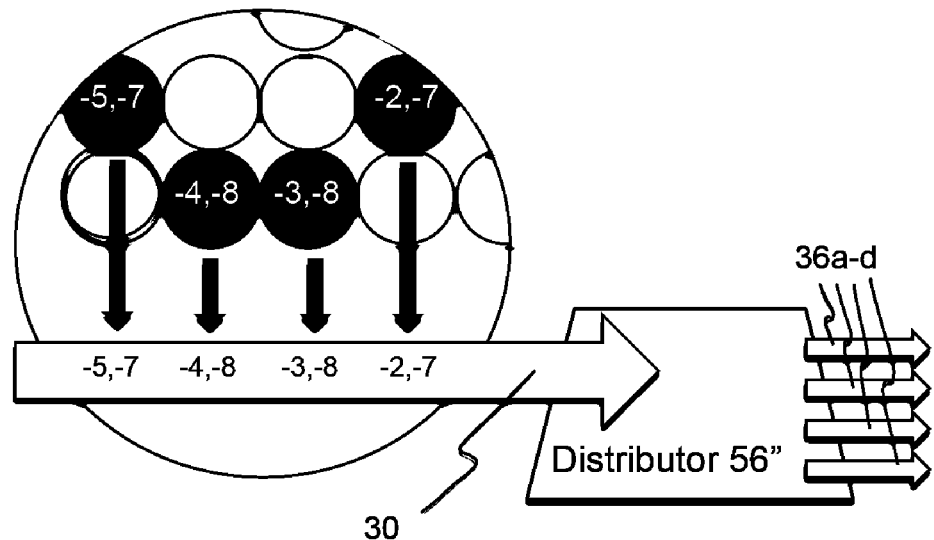

FIG. 22A shows a distributor that can provide separate distributions for signed address components.

Figure 22B:
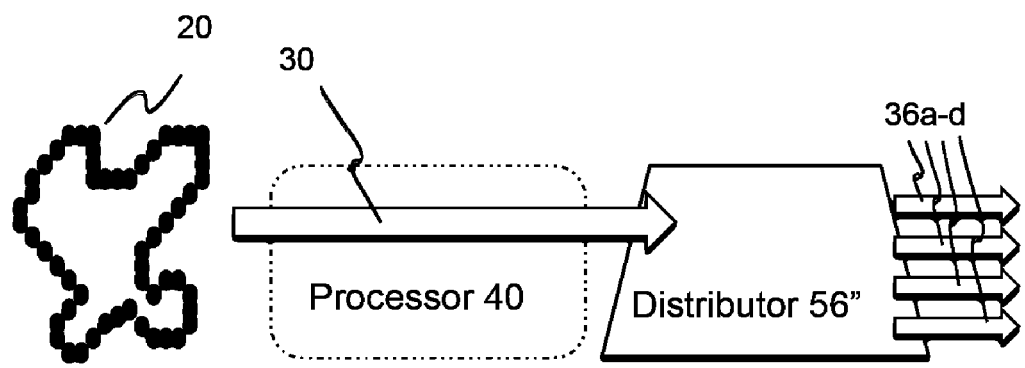

FIG. 22B illustrates that this method also eliminates the need for processor 40.

Figure 22C:
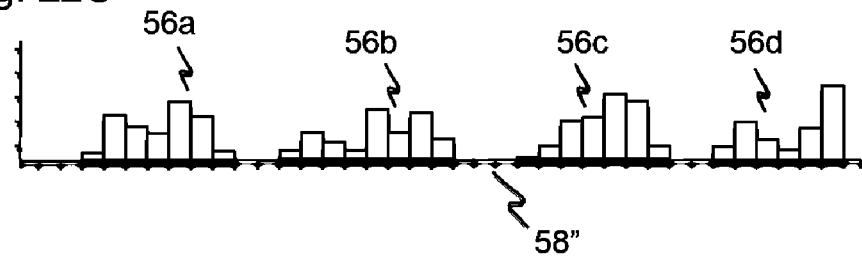

FIG. 22C shows the signed X and Y distributions being combined to form a summary distribution.

Figure 23:
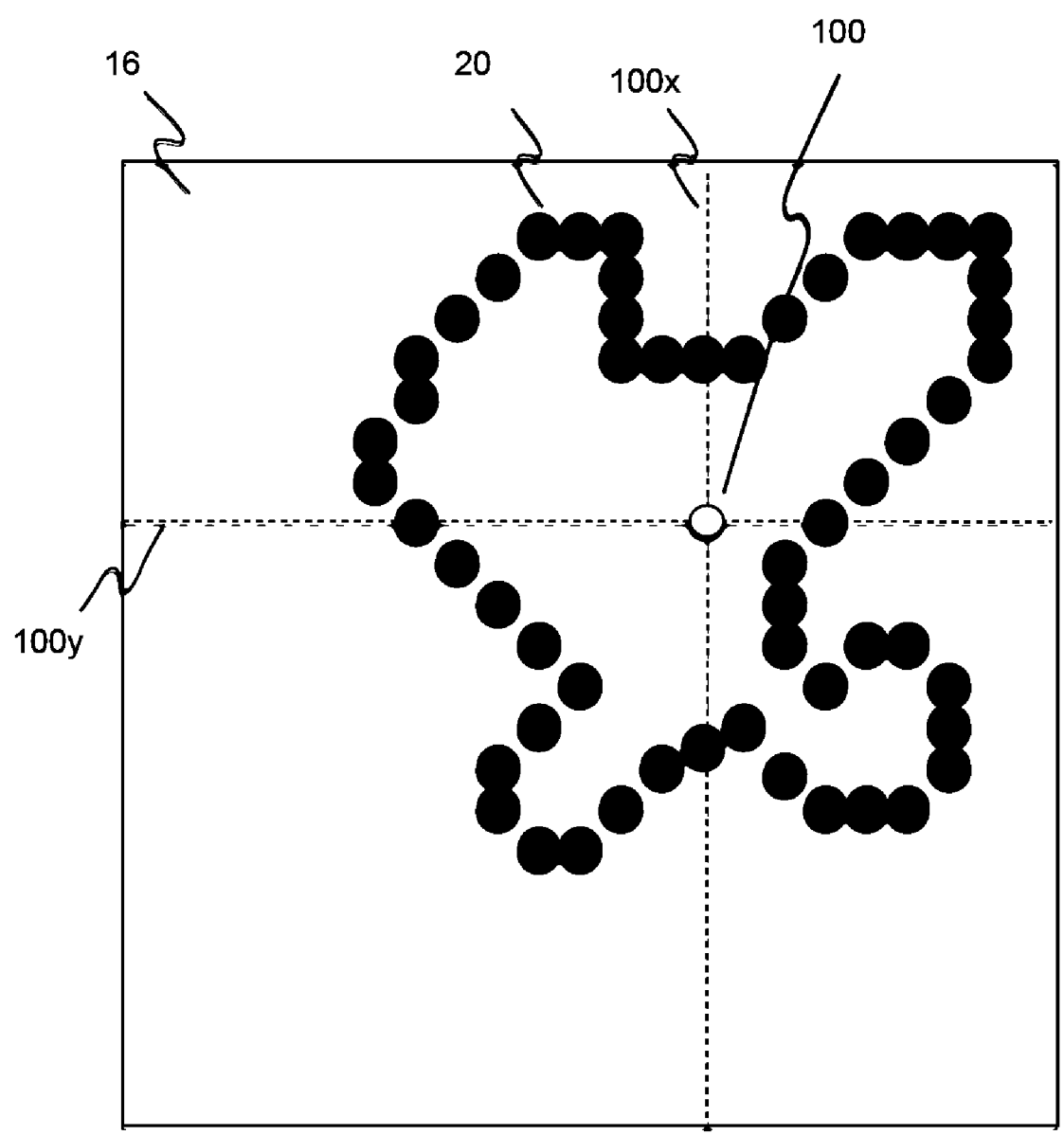

FIG. 23 illustrates that the address components can be adjusted to provide values that center on the centroid of the pattern.

REFERENCE NUMERALS 10 marker array 10' distance indexed marker array
10a-c example markers 10" virtual hub
10a'-c' distances of 10a-c to hub 40a 10d marker array for three states
10x marker array to be supplemented 12 raster polled marker array
14 marker array with fixed sectors 16 large marker array
18 array that can mark brightness levels 20 pattern of toy boundary
20' pattern of damaged toy 20a pattern from sector 76
20a' pattern from sector 76' 20b large pattern
20c large ragged pattern 20d large sparse pattern
22 pattern from white markers 23 pattern with many brightness levels
24a frog pattern 24a' sparse frog pattern (50%)
24a" sparse frog pattern (25%) 24x generic label for 150 shapes
24x' generic label for 50% sparse 24x" generic label for 25% sparse
30 signal for addresses 30' signal for 10' distances
30 a-d signals from sectors of array14 30e signal for marker value and address
31 signal of raster scanned addresses 31a,b signals from filter 80
32 signal for distances 32a-c signals from multiple hubs
34 signal for distribution values 34', 34"signals of distributions 50a, 50a'
36 signal for address value distribution 36a signal for −X address components 36b
signal for +X address components 36c signal for −Y address components 36d
signal for +Y address components 36x signal for X address components 36y
signal for Y address components 40 distance processor
40a hub at 0,0 address 40b hub at centroid of pattern 20

40c-e hubs for perspective summaries 40x processor to be supplemented
42 processor for large array 44 processor able to select multiple hubs
46 processor containing filter 82 46' processor containing filter 82'
46a processor containing filter 84 46b processor containing filter 86
50 distributor 50a distribution from pattern 20
50a' distribution from pattern 20' 50b distribution of pattern 20 on array 16
50b' distribution normalized from 50b 50c distribution of pattern 20b on array 16
50c' normalized distribution of pattern 20b 50c" rebinned distribution from 50c'
50d' normalized distribution of pattern 20c 50d" rebinned distribution from 50d'
50e' normalized distribution of pattern 20d 50e" rebinned distribution from 50e'
50f 3D distribution of pattern 23 50x distributor to be supplemented
51 array of distribution differences 51' array of squared differences
51" sum of squared differences 52 distributor for large array
52a frog distribution 52a' sparse frog distribution (50%)
52a" sparse frog distribution (25%) 52x no sector distributions of 150 shape
52x' no sector distributions 50% sparse 52x" no sector distributions 25% sparse
54 distributor interacts to rebin 54a-d distributions of 24a sectors
54e combined sector distribution 54x combined distributions 150 shapes
54x' combined distributions 50% sparse 54x" combined distributions 25% sparse
56 address distributor 56' distributor for X,Y components
56" distributor for signed X,Y components 56a distribution for −X components
56b distribution for +X components 56c distribution for −Y components
56d distribution for +Y components 56x distribution for X components
56y distribution for Y components 58 summary distribution of address values
58' summary distribution for X,Y 58" summary distribution of signed X,Y
60 comparator 60x comparator to be supplemented
62 comparator with enhanced functions 62a criterion component
62' first half of memory set 62" second half of memory set
64 comparator interacts to rebin 70a,b sectors derived from signal 31
72a,b sectors specified by filter 80 74a-d sectors of array 14
76 sector specified by filter 82 76' sector specified by filter 82'
78a-d sectors on frog centroid 80 filter that sorts addresses
80x filter to be supplemented 82 filter allows only sector addresses
82' filter allows only specified distances 84 filter to reject unwanted marker value
86 filter to sort marker values 88 filter sorting X and Y addresses
90 general-purpose computer 92a instruction to initialize bin counts
92b instruction to retrieve marker address 92c instruction to compute distance value
92d instruction to add to distribution 92e verify whether all markers tallied
92f instruction to stop 92 series 94a retrieve distributions to be compared
94b set sum to 0 and begin at first bin 94c calculate difference at chosen bin
94e verify if all bins have been evaluated 94f move to next bin position
94g instruction to stop 94 series 100 centroid address
100x centroid axis for X components 100y centroid axis for Y components

GLOSSARY OF KEY TERMS abscissa: The horizontal axis of a distribution, which for the present system provides a scale of alternative distances (from marker to hub) that are observed, or a proportional index thereof.

addresses: The values of a coordinate system that specify the location of each element. For the embodiments that are illustrated, Cartesian addresses are used. A given Cartesian address consists of a pair of values (designated as X and Y—or x,y—where the first value specifies the horizontal distance from a vertical axis and the second value specifies the vertical distance from a horizontal axis. The axis lines are orthogonal (at right angles to one another), and the intersection of the two has a 0,0 address. For the upper right quadrant of the coordinate system the X and Y values are both positive; both values are negative in the lower left quadrant; in the upper left quadrant the X values are negative and the Y values are positive, and for the lower right quadrant the signs of the two values are the reverse.

array: Any discrete positioning of elements in which the location of a given element can be specified using a coordinate system.

bin: A subrange of values for the abscissa or ordinate of a histogram distribution. For present purposes, the bins of the abscissa partition the full range of distances measured, or provide a range that is proportional to these distances. The bins of the ordinate partition the number of observations, or a range that is proportional to this number. Related methods can be applied to continuous distributions.

centroid: Generally, the geometric center of a set of points. As used in vision, it is the center of points in a pattern, or the major contours (sometimes limited to the outer boundary) of a shape. For purposes of specification and claims, it is a point within the array of elements that provides a minimal sum of all straight-line distances from the point to each marked element of the array.

Chi Square test: A quantitative method for comparing two distributions. At specific (generally equal) intervals on the abscissa, one records the height difference for the two distributions. Each difference value is squared, and the resulting value is made proportional to (divided by) the original distribution heights, eliminating any computation that divide by zero. This is done twice to provide proportions with respect to each distribution, then all of the proportions are summed. If the distributions are identical the Chi Square value will be zero, and it gets larger as the two distributions become less similar.

convergence hub: This is a location that has been designated for calculation of distance values. The distance of each marked element of an array to the convergence hub is a value that is used to evaluate the pattern to be summarized. In the examples given, the convergence hub is either the center of the coordinate system for the array, or the centroid of the pattern.

coordinate axes: These are lines that specify the location of zero within an array of elements, the vertical line being zero for the X component of the coordinate system, and the horizontal line being zero for the Y component of the coordinate system.

distance: Distance values represent the spatial location of marked elements in relation to a convergence hub. In most examples a Euclidean distance is used, this being the shortest length between a marked element and the convergence hub.

distribution: In its simplest form with respect to the present system, a distribution is a two-dimensional histogram plot of distance values on the horizontal scale (the abscissa), and the number of observations at each distance on the vertical scale (ordinate). The scales can be transformed so that the abscissa does not represent integer units of distance, and the ordinate does not represent a simple count, but the scales are always proportional to these underlying measures. Transformations can also provide for continuous distributions rather than histograms.

filter: This term is used as in the Neuroscience and Vision research communities, to mean a mechanism or process that can discriminate among alternatives, e.g., addresses, or states, to provide blocking, inclusion, or sorting of the alternatives.

label: This is a name, number or symbol that designated a particular state, attribute or condition. As used here, it provides a method for distinguishing the elements of a given pattern from background, or from alternative patterns. Most often the label would be a value (number), such as 0 and 1, but other symbols could be used. Further, while the term is needed to communicate about the method, the label represents the pattern and is not the pattern, per se. Therefore any attribute or condition of a specific subset of array elements can provide a pattern, and the label is used to identify that condition.

marked: This can be considered as an alternative way to describe being labeled. The element of the array has a single condition that that is part of a pattern to be evaluated, with the full complement of marked elements providing the pattern.

marker: A alternative term for a marked element.

normalized distribution: As used here, this provides a transform of the distribution so that the abscissa is rescaled as a proportion of the range of observed distances, and the ordinate is rescaled as a proportion of the number of observations.

ordinate: The vertical axis of a distribution, which for the present system provides a scale for the number of observations of distance, or a proportional index thereof polling: Known methods for sampling the values (usually addresses) from elements of an array. Most often this is done by choosing each element successively, and transferring the values sequentially as a temporal signal.

raster scan: A systematic polling of address values, in which one successively polls the elements with a row, then those of the next row, until the full array has been polled.

rebinning: A transformation that alters bin size in relation to the ordinate or abscissa.

signals: Successive steps of the system require the use of known methods for copying or transferring values one component to the next. In the first embodiment, for example, the address values from array 10 are transferred to processor 40 which derives distances from each marked element to a convergence hub, those distance values are transferred to a distributor 50 which constructs a summary distribution consisting of values, and the distribution values must be transferred to a comparator 60 that compares the values with those of other distributions. All such transfer (or copy) operations are described as signals.

SSD: see sum of squared differences state: Any discrete condition that is known or can be established, and which can be identified by a label, i.e., a name, number, or symbol. In an electronic array of pixels, for example, the state of a transistor in the pixel circuit has a voltage that is either high or low (designated as a 1 or 0, respectively). Most of the figures of this application use only two states (black and white) to illustrate operational principles.

sum of squared differences (SSD): This is a quantitative method for comparing two distributions. At specific (generally equal) intervals on the abscissa, one records the height difference for the two distributions. These difference values are squared, and then the squared values are summed. If the distributions are identical the SSD will be zero, and it gets larger as the two distributions become less similar.

unit distance: The spatial separation among elements of an array, one unit being the center-to-center distance between two neighboring elements that are aligned either horizontally or vertically.

DETAILED DESCRIPTION

First Embodiment

Basic Components and Clarification of Terms

Figure 1:
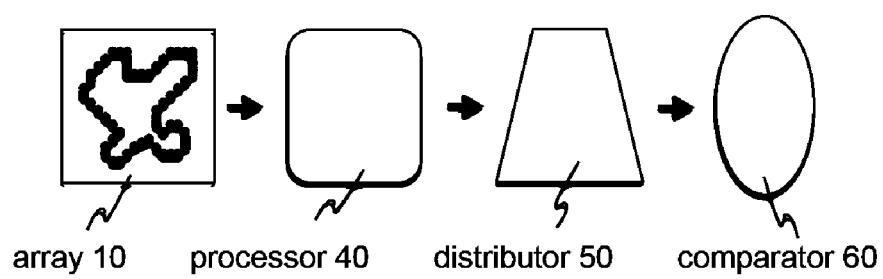
FIG. 1 shows the basic components of a first embodiment of my system.

The first embodiment of my system is comprised of basic four components, as illustrated in FIG. 1. It includes a marker array 10, a distance processor 40, a distributor 50, and a distribution comparator 60, as well as communication links for coupling values from one component to another. Details of operation and terminology are provided in subsequent sections, but the following provides a broad summary of the overall function.

Marker array 10 has elements that manifest the pattern, designated as "marked" elements, and provides coordinate addresses that specify the location of these elements.

Distance processor 40 uses these address values to specify a central location within the pattern, designated as a "convergence hub." (not shown) and to determine the distance of each marked element from this hub.

Distributor 50 tabulates the number of times that a given distance has been observed, and expresses this as a "distribution."

Comparator 60 is able to compare distributions that have been derived from alternative patterns to determine similarity, which allows for discrimination of one pattern from another, or recognition of an unknown pattern from among an inventory of known patterns.

Electronic cameras, scanners, digitizing pads, and graphics programs create an electronic representation of a shape or pattern as a 2D or 3D array of values. Where the values have only two levels, e.g., 0 and 1, the array is said to have binary states. Most illustrations of the present system will show binary states, with white being background and black specifying the shape or pattern to be evaluated, and a black element is described as being a "marked" element, or simply a "marker." The term "array" means any discrete positioning of elements in which the location of a given element can be specified using a coordinate system. [See Glossary for a more comprehensive definition of "marked" and "state."]

The present method uses information about the location of each marked element of the array, these elements providing the pattern to be encoded. The first embodiment will specify the location of marked elements by means of addresses. The method will be described using base-10 integers, such as 0, 1, 2, 3, but it is not limited to integers or to base-10 numbers.

Although an application can be tailored to be especially effective for shapes rather than patterns, or vice versa, the fundamentals of the system are essentially the same for both. Therefore the terms "shape" and "pattern" are used interchangeably. The use of one or the other term in describing or illustrating a particular embodiment should not be taken as limiting the method.

Figure 2A:
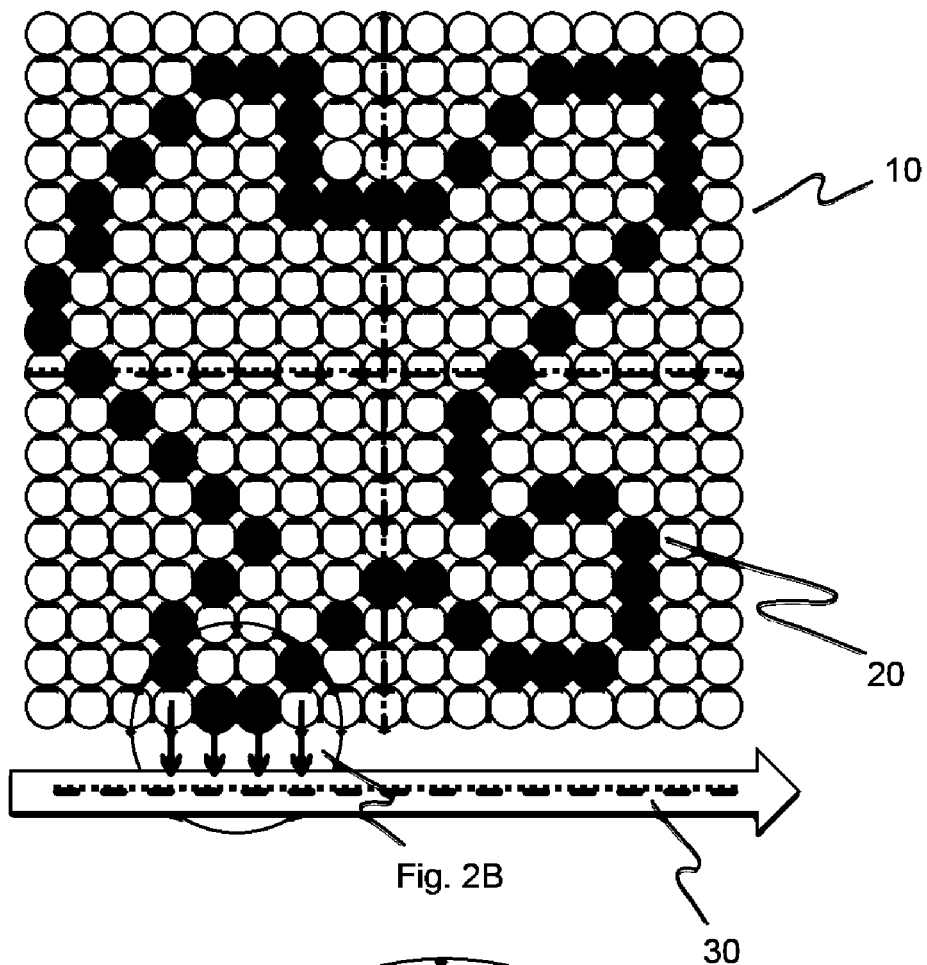
FIG. 2A shows a marker array used in the system of FIG. 1, with a pattern of elements marked as black.
Figure 2B:
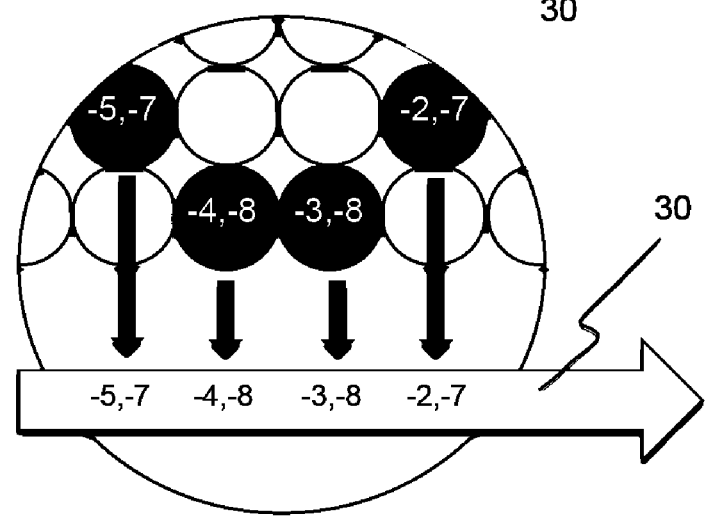
FIG. 2B shows an enlarged portion of the marker array in FIG. 2A.

Marker Array—FIGS. 2A and 2B

The system can be used to examine a manufactured object, such as a toy, and to determine whether it has defects. The manufacturer will want to reject any object that has a missing part, and inspects each object using a digital camera to see that the object is complete. The shape of the outer boundary is one factor in this inspection process, and the present task is to determine whether the outer boundary of each object matches a shape that has been judged to be the same as an ideal prototype of the toy. Using known methods the image from the digital camera array is processed to mark certain elements of array 10, this providing a pattern 20 that is illustrated in FIG. 2A.

FIG. 2A shows marker array 10 with an expanded view (FIG. 2B) that shows the elements of the array and the marked elements of pattern 20. The location of each element is specified using Cartesian coordinate addresses. The dash coordinate lines that intersect in the middle of FIG. 2A show the axes of the coordinates (as explained more completely below). The marked or black elements of the array, shown in black, provide the pattern to be summarized, designated as a pattern 20.

FIG. 2B shows a portion of array 10, and provides the addresses of four of the marked elements. The left value of each address is designated as X, and the right value is designated as Y. Each X,Y pair specifies the distance of a given element from the center of the array, which is at the intersection of the dash lines that provide the axes of the coordinate system. [For more complete details, see "addresses" in the Glossary.]

Array 10 provides a means for polling each element to determine whether it is marked. If the element is marked, the address at that location is transferred as a signal 30 to the next processing step of the system, i.e., to distance processor 40.

The method by which the elements are polled and sampled is unimportant for this embodiment, and for most embodiments is described subsequently. Thus the marked addresses can be transferred into signal 30 in any order. Given this, the process that is used to sample array 10 can provide a different ordering of addresses than what is shown in FIG. 2B. Further, other means can be used to sample the first and second components of each address, and it is not necessary to keep them paired for transfer into a single signal. However, if the X and Y components of the address are separated, it is critical that the sampling and signaling method provide consistent tracking so that the pair values, i.e., the X and Y of each address, can eventually be used in tandem by the next processing stage.

The elements of array 10 are shown as closely packed (contiguous) circles, but the shape of the elements themselves is not relevant to the method. Other shapes such as square and hexagonal can be used and the elements need not be contiguous.

Figure 3A:
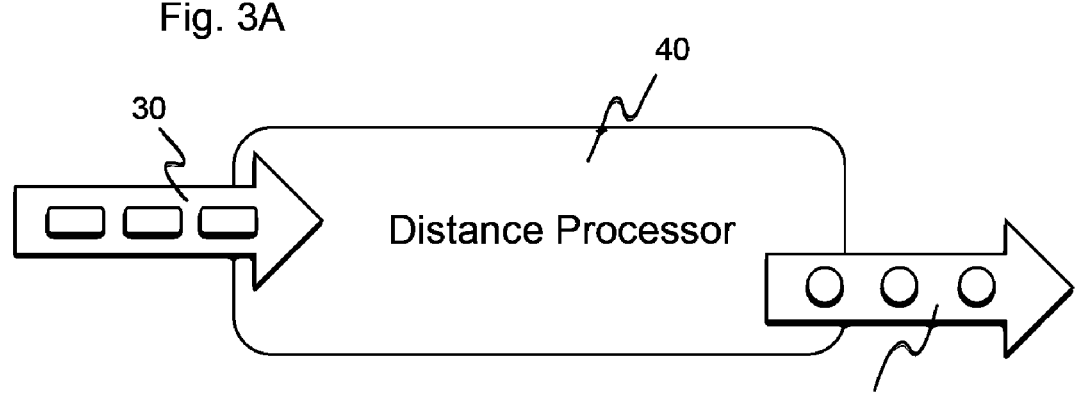
FIG. 3A shows a processor that calculates distances from each marker to a central hub.
Figure 3B:
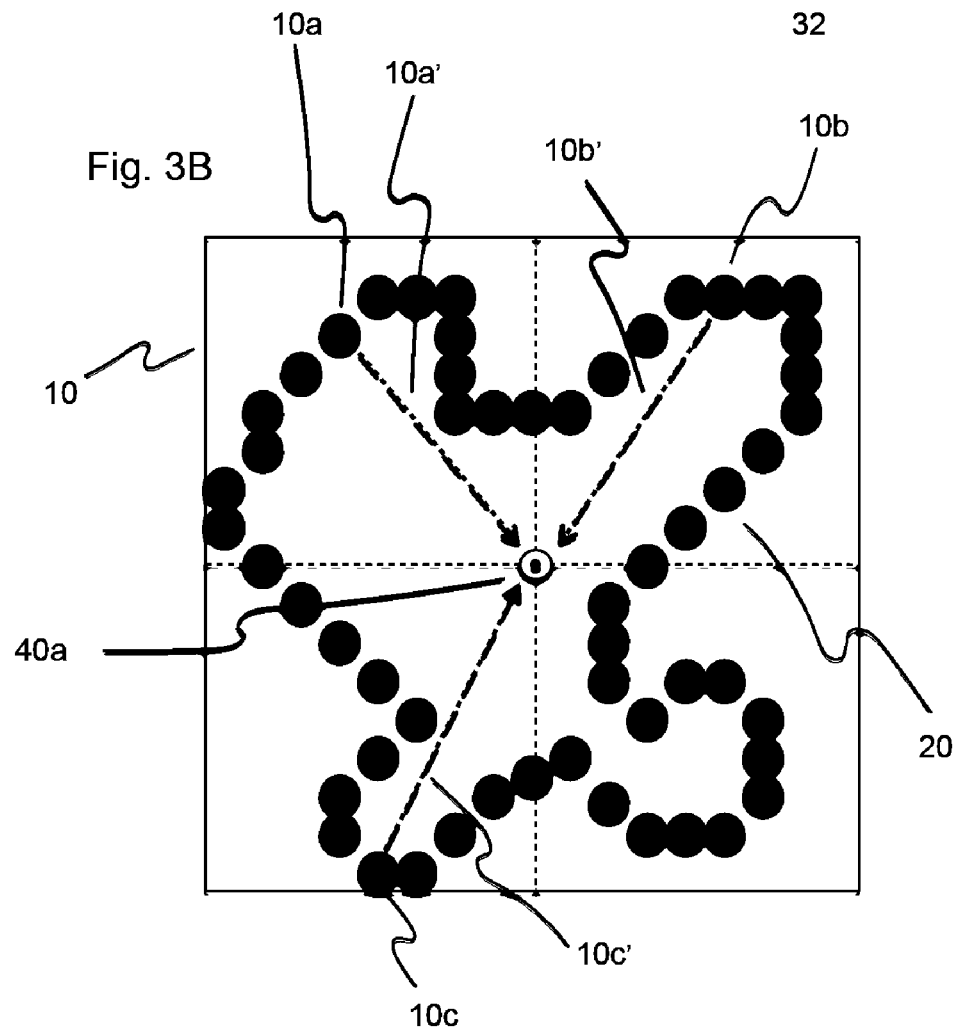
FIG. 3B shows that distances to a central hub are derived by the processor in FIG. 3A.

Distance Processor 40—FIGS. 3A and 3B

FIG. 3A shows distance processor 40. It receives the address values from signal 30 (these being illustrated as small rectangles). It derives values that correspond to the straight-line (Euclidean) distance between a convergence hub 40$a$ (illustrated in FIG. 3B, below), and each of the marked elements of the array. For this embodiment the 0,0 address of the Cartesian coordinate system is used as the hub. Processor 40 provides the distance values by applying the Pythagorean theorem, which specifies the hypotenuse of a right-angle triangle where the lengths of the two sides are known. Each marker address specifies the horizontal and vertical distances from the origin of the coordinate system, i.e., the 0,0 address, to the marker. Therefore the X value in the address provides the length of one side of a right angle triangle, and the Y value gives the length of the other. The hypotenuse is the distance between the marker and the origin of the coordinate system, i.e., the 0,0 address, and this can be known by applying the Pythagorean calculation to the address values.

Restating the essential calculations, each distance value is derived by squaring each member of the address, i.e., X and Y, summing the squared values, and then taking the square root of that sum. These distance values are then sent from processor 40 as a sequence, this being illustrated in FIG. 3A as a series of open circles within signal 32.

FIG. 3B again displays pattern 20. The unmarked (white) elements are no longer shown, which will be the practice for all remaining figures. Hub 40$a$ is shown at the center of the array, and a set of markers 10$a$-$c$ have been singled out for illustration of distance calculations. A distance set 10$a'$-$c'$ represent the spans from markers 10$a$-$c$ to hub 40$a$. Each span is represented as a value that has been derived by the calculation specified above, and these values are delivered in signal 32, as illustrated in FIG. 3A.

Because the address of hub 40$a$ is 0,0, it is not actually needed in the computation of distance values, but is provided in FIG. 3B only to designate a reference location from which the distances are determined.

Marker 10$a$, with an address of −5,6, provides a calculated distance value of 7.8 (the square root of −5 squared plus 6 squared). The distance value for address 5,7 is 8.6, and the distance for address −4,−8 is 8.9.

Although only three distances, i.e., 10$a'$-$c'$, are illustrated, a distance value from each marker address will be calculated and included in the sequence of signal 32. As stated, the order in which the distance values are included is not important, but normally they match the order of the addresses themselves.

If array 10 has an even number of columns and rows, the 0,0 of the Cartesian coordinate system falls at the intersection of four array elements rather than being the address of an element. In like manner the location of each address lies at the corner of an element rather than at its center. Because of this, the distance calculation provided by the Pythagorean theorem will be very slightly in error, as it will give the distance to a corner of a marked element rather than to the center of the element. For an array that has a useful number of elements, this error is very small and can be ignored.

Figure 4A:
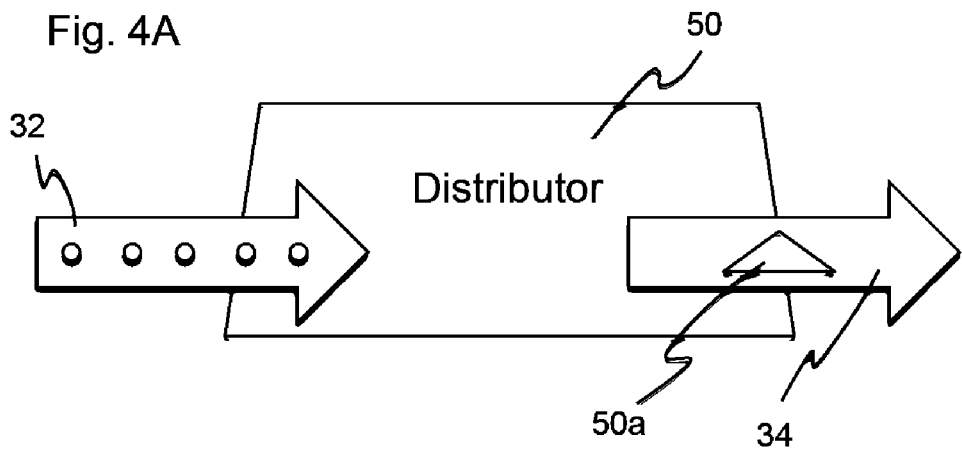
FIG. 4A shows a distributor that constructs a distribution of the distances provided by the processor in FIG. 3A.
Figure 4B:
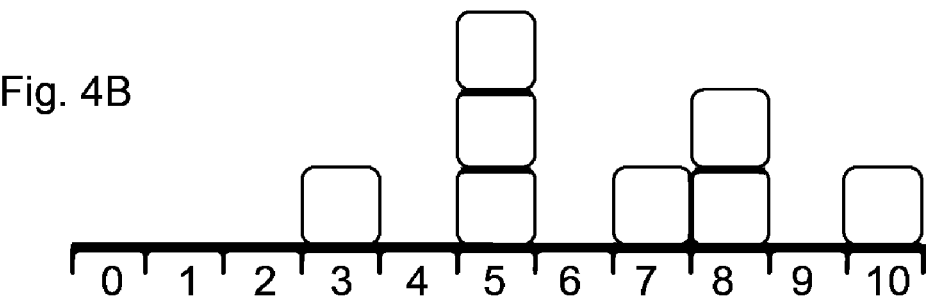
FIG. 4B shows a partial distribution that was derived by the processor in FIG. 3A.
Figure 4C:
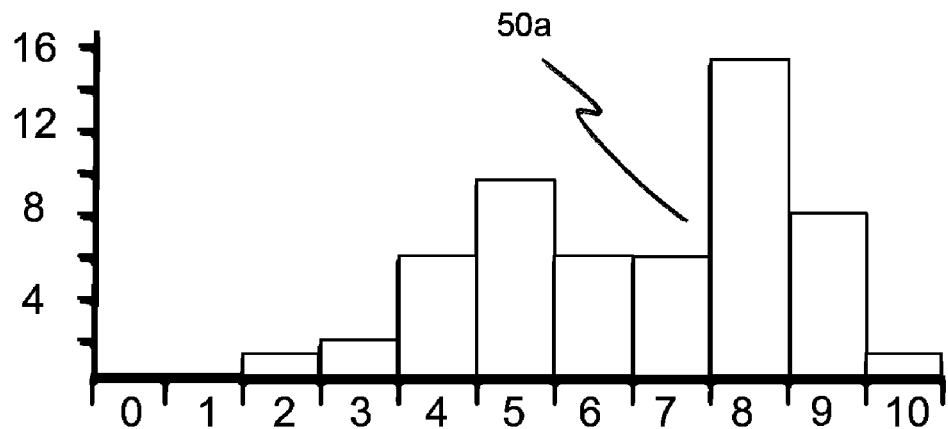
FIG. 4C shows the complete distribution of all distances provided by the processor in FIG. 3A, which provides a summary of the pattern shown in FIG. 2A.

Distributor 50—FIGS. 4A and 4C

As shown in FIG. 4A, distributor 50 posts the distance values received from processor 40 to construct a distribution 50$a$ that summarizes pattern 20 (as shown in FIG. 2A). Signal 32 is again shown carrying distance values (small circles) into distributor 50. After construction of the distribution, as described below, the distribution (50$a$) is sent out from distributor 50 as signal 34.

In FIG. 4B the alternative distances that can be observed are shown as "bin positions" (or just "bins")—these being increments of distance along the horizontal axis. Upon receipt of distance values from signal 32, distributor 50 adds one vertical count into the distribution in the bin that corresponds to that distance value. A partially completed distribution is shown in FIG. 4B; it illustrates that one marker was at distance of three units from hub 40a, three were at 5 units, one was at 7 units, etc. A "unit" is the distance between an element of the array and its neighbor in either the vertical or horizontal direction, and integer values have been used for purposes of illustration. Altogether, FIG. 4B shows stacking of 1, 3, 1, 2 and 1 observation(s) into bins 3, 5, 7, 8, and 10, respectively.

FIG. 4C shows a distribution 50a that has been provided with all distances that were calculated for pattern 20 (FIG. 2A). For this embodiment the height of a given bar corresponds to the number of times a specified distance was observed. The completed distribution can also be described as specifying the frequency at which distances contributed from pattern 20 can be observed.

Once the full distribution has been constructed, the height (count) in each bin of distribution 50a is transmitted to the next processing stage (as signal 34) in an order that preserves its relation to the bin scale, or with a notation that identifies the bin of origin.

It is convenient to describe the distribution that is derived by this process a "summary distribution," meaning that the distribution has provided a summary of the pattern.

Integer values of distance have been used to illustrate the operation of distributor 50. However, well known methods are available for processing decimal values, wherein the values are partitioned into integers that are suitable for inclusion into a distribution. In like manner, distance values can be processed for inclusion into a smooth distribution, such as one where the height of the distribution reflects the probability of observing a given distance value. These operations can be incorporated into the design of processor 40, but providing it as a function of distributor 50 will often be advantageous.

Figure 5A:
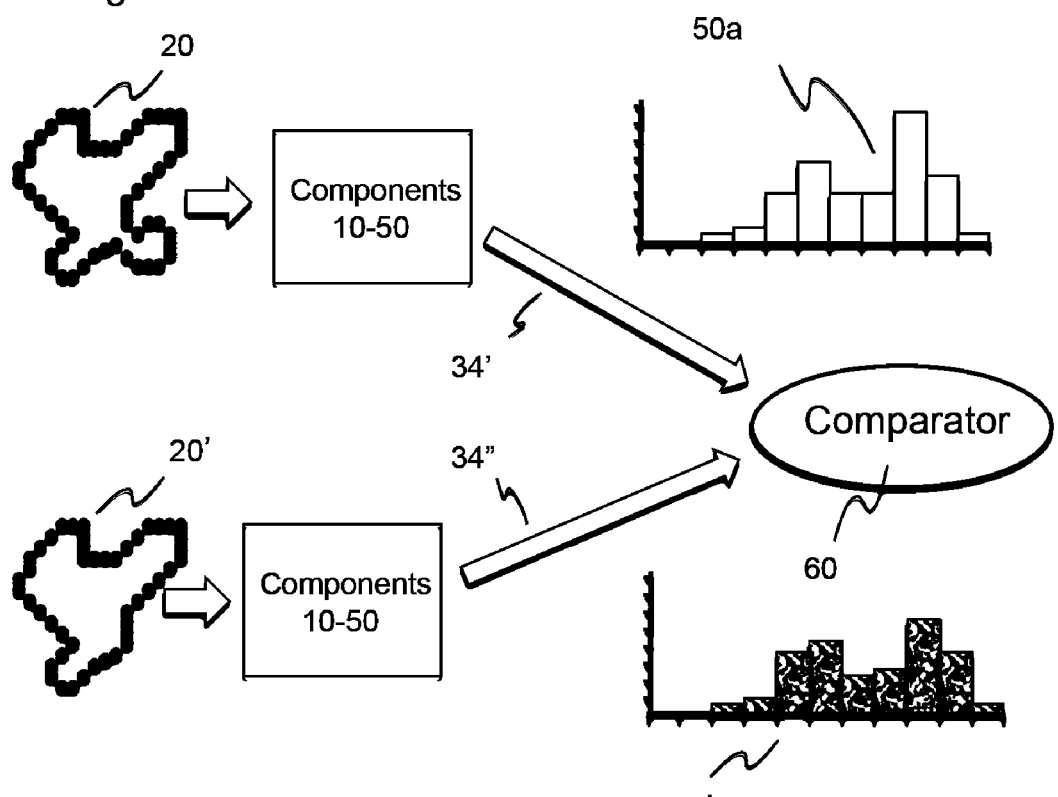
FIG. 5A shows a comparator that can evaluate similarity of two different distributions provided by the system.
Figure 5B:
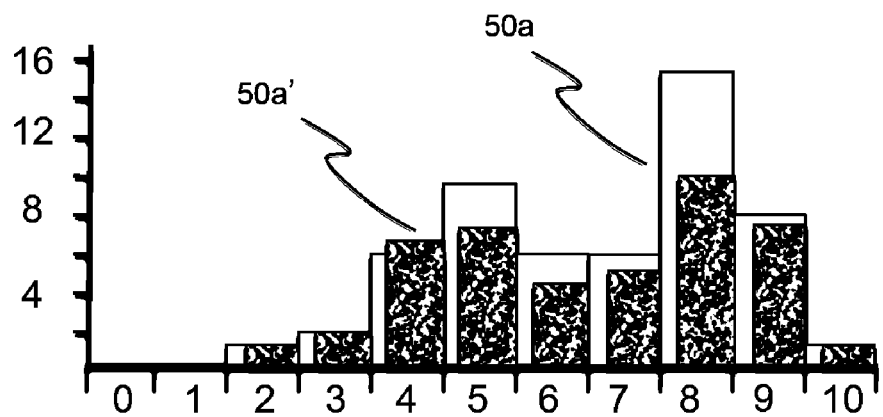
FIG. 5B shows that the summary distributions being compared in FIG. 5A are not identical.

Distribution Comparator 60—FIGS. 5A and 5B

Distribution comparator 60 (FIG. 5A) is designed to make a comparison of two distributions to determine if they match—a process called discrimination. To do so, comparator 60 must receive the distributions as tandem signals or be able to store one while the second is being constructed. For simplicity, the illustrated embodiment assumes sufficient memory to store a distribution that has received from distributor 50, and is able to make that distribution available for comparison to a subsequent distribution that has been constructed using the same system. The signals for the two distributions are designated as 34' and 34".

FIG. 5A shows that array 10, processor 40 and distributor 50 (designated in the figure as "components 10-50") have provided a distribution 50a that summarizes pattern 20 (from FIG. 2A). This is stored in comparator 60. A second pattern 20' is also processed by components 10-50, yielding a distribution 50a' that is also transferred to comparator 60.

FIG. 5B illustrates a comparison of the two distributions to determine whether they are identical. In this illustration, the bars of distribution 50a' have been narrowed, thus allowing the heights of bars in distribution 50a to be seen when the two distributions are superimposed.

Comparator 60 examines the heights of the two distributions at corresponding locations on the distance scale, and judges pattern 20 and 20' to be the same only if all heights are equal.

Given that the heights of the distributions do not match in FIG. 5B, the evaluation by comparator 60 will indicate that the patterns are different.

Utility of the First Embodiment

A very elementary embodiment was chosen for initial explanation of these methods. But even this simple embodiment has utility for some applications, such as examining a manufactured item for possible defects E.g., the toy that was the source of pattern 20', as shown in FIG. 5A, can be examined for an irregular (non-standard) shape, which will indicate a manufacturing defect). One can store the distribution for an ideal prototype in memory, and then compare the distributions from all subsequent items to determine whether an error in the manufacturing process has occurred. Any missing part, or defect in the boundary that produced a different pattern on the array can thus be detected, and the item can be rejected.

Note that the system of FIGS. 1 to 5B has rendered a 2D pattern of marked elements as a 1D summary; this is a major benefit. Many methods of 2D pattern analysis require far more steps, and often must be tailored to the pattern being evaluated. The present system can be applied to any pattern that is present in the array, which allows the process to be used for a new manufactured item without a change in the analysis being performed.

The simplicity of the first embodiment is of benefit for implementing micro-circuit sensors, what some have called "smart sensors." These are of interest in the field of machine vision where speed, size, and low power consumption are at a premium. One known method provides the operational principle used for marker array 10 (though not any other portion of my system). The known method registers specific changes of pixel values, and then transmits the address at which each change took place. This is generally called "address event representation" (AER). One can find an example of such a system in Lazzaro, J. and Wasrzynek, J., A multi-sender asynchronous extension of the AER protocol, Advanced Research in VLSI, 158-169 (1995). The "event" in the present case is the act of changing the value of an element from a 0 (white) to a 1 (black). In many AER systems these transitions of value are sent from the array as a signal in an asynchronous manner as they occur. Since order is not a factor in the present method, it will readily accommodate the asynchronous registration of pattern information.

Alternative Embodiments

Various alternative embodiments of the system components will prove useful, depending upon the specific application. A very simple design can provide for high speed, low production cost, with high densities in the array. A very complex design will be more adaptable by providing a large memory with alternative processing operations, and countless other computational benefits. Which design to adopt depends upon the application, and the goal of the following sections is to provide a number of alternative embodiments that will be useful.

For array 10, alternative methods of specifying the marker addresses can be used. For example, if array 10 used all positive numbers, and began the zero points of address sequence in the lower left corner of the array, the array will correspond to the upper-right quadrant of the Cartesian coordinate system. One derives the same distance measures for signal 30 by specifying hub 40a at the center of that quadrant, and then adjusting all addresses by first taking the difference between the address in array 10 and the address of hub 40*a*. Similarly, because hub 40*a* lies at the 0,0 address, these address components are not really needed for calculation of distances. Other address locations for the convergence hub can be used, in which case the hub address will be a factor in the calculation. This, and other means for adjusting to alternative coordinate systems are well understood, and do not require additional explication.

If a modification alters the number of signals that are generated within a component, then all subsequent components must be modified to process those separate signals, and so that separate distributions can be created and compared. In general this can be accomplished by simultaneous or successive application of the methods that have been explicated. Unless the basic operations of these components are modified, these alterations will not be illustrated.

Some operations can be implemented at various stages in the process. In such cases, it will be explained and illustrated in one component, but this should not be considered a limitation on the system.

Figure 6A:
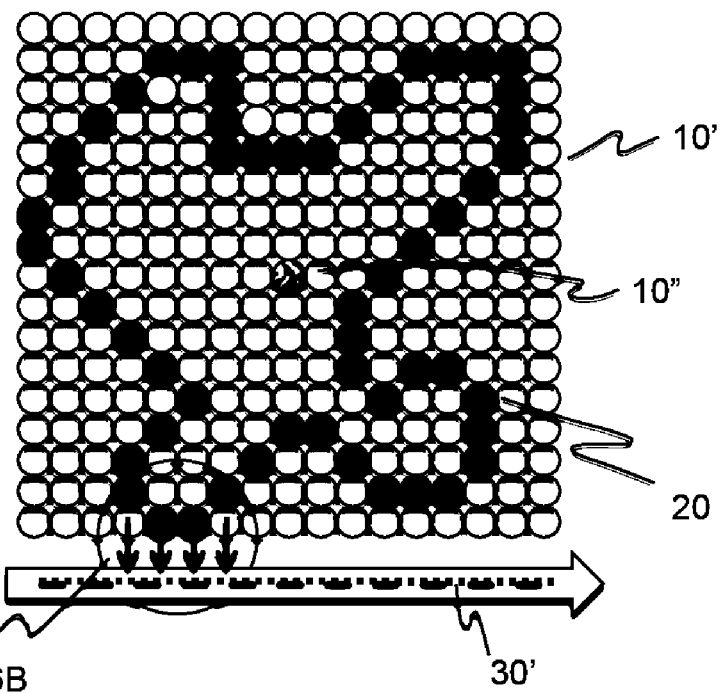
FIG. 6A shows a marker array in which each element can provide a value that specifies its distance from a central hub.
Figure 6B:
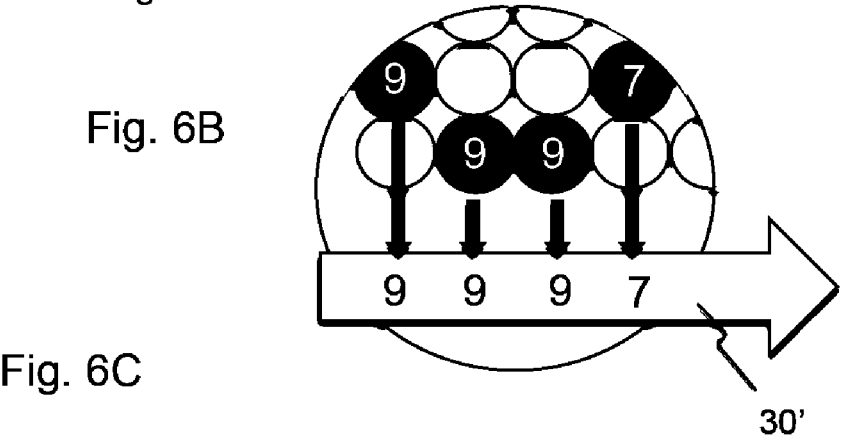
FIG. 6B shows an enlargement of a portion of the marker array in FIG. 6A.

Alternative Means for Providing Distance Measures—FIGS. 6A and 6B

Some embodiments provide a means to determine distance measures other than through application of the Pythagorean theorem. For example, if the marker array is structured for use of polar addresses, then one component of each address contains the distance value, and upon being sampled, it can be delivered directly into signal 32. In that case, processor 40 is not needed.

One can also provide direct distances from a conventional array having rows and columns. In FIG. 6A, each element of an array 10' is designed to transfer a distance value directly into a signal 30'. The value corresponds to the distance between that element and a hub 10". As with hub 40*a*, which used a 0,0 address as the origin for application of the Pythagorean theorem, hub 10" does not provide a value that is used for computation. It is shown in the illustration to designate the location to which the distance values pertain.

FIG. 6B shows four marked elements in array 10, with each being labeled with the distance value that is provided in signal 30'. These distances have been rounded to integers for purposes of illustration.

Figure 6C:
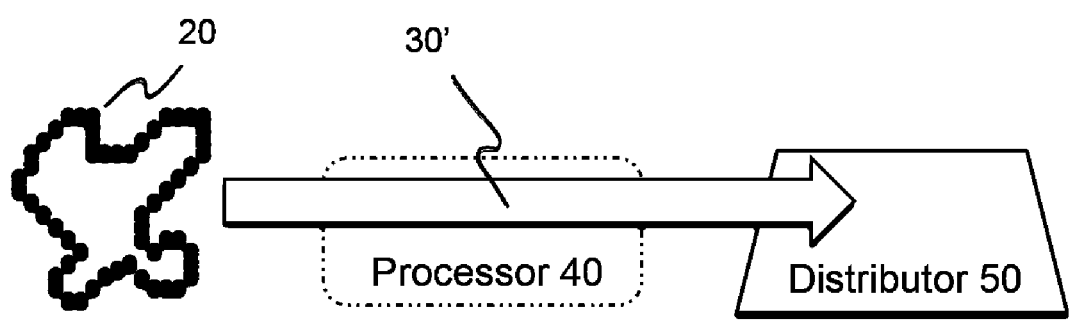
FIG. 6C shows that this embodiment can eliminate the need for a distance processor.

FIG. 6C illustrates that array 10' provides the values that are required by distributor 50, and thus eliminates the need for signal 30 and processor 40. (FIG. 6C illustrates processor 40 in broken lines to show that this component is not required.)

This extremely simple design will be favored where high speed, low array manufacturing cost, and/or low power consumption are major considerations. The array will be less adaptable than other methods described below, but will be sufficient to accomplish the pattern evaluation for many applications.

Figure 7A:
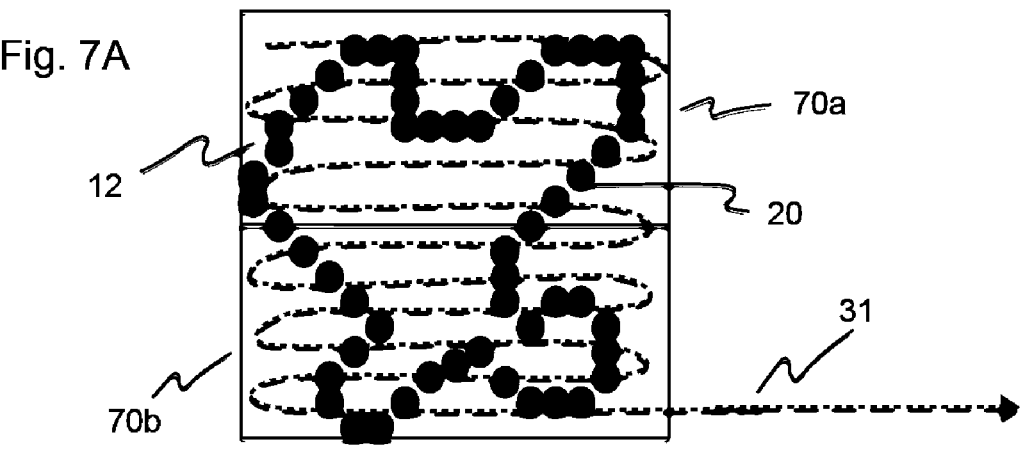
FIG. 7A shows a marker array in which the polling of elements is sequential, thereby providing a basis for specifying sectors of the array based on the order in which addresses are received.
Figure 7B:
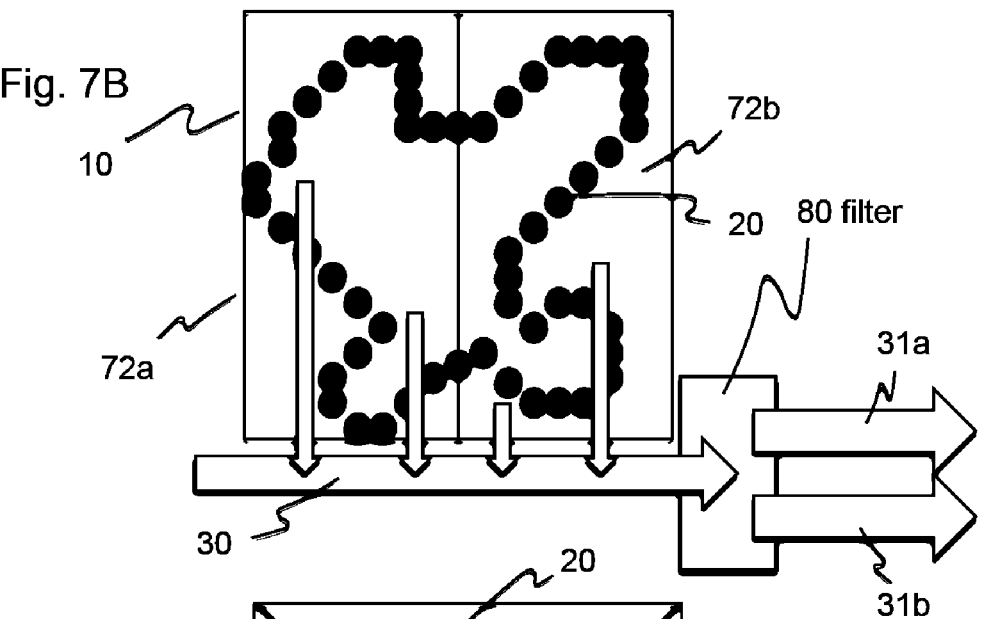
FIG. 7B shows the addition of a value filter that can sort addresses received from the marker array shown in FIG. 2A, thus providing a means to designate sectors.
Figure 7C:
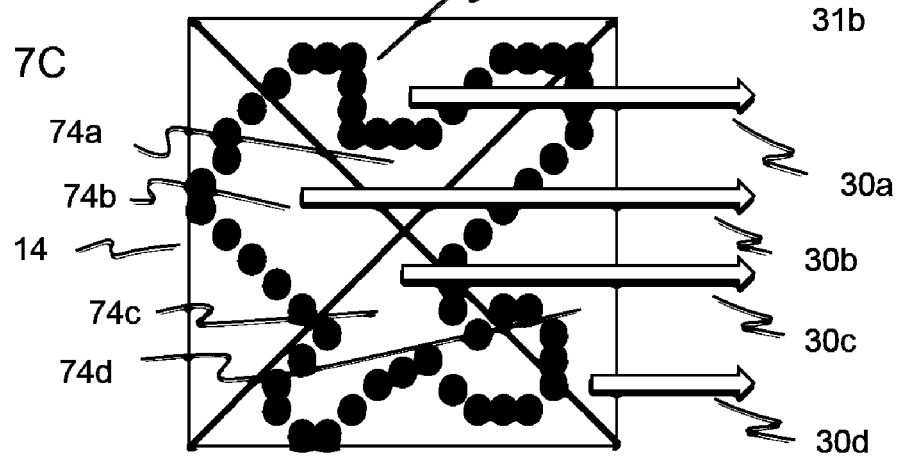
FIG. 7C shows a marker array that provides independent sectors within a marker array.

Providing Differential Sampling of Sectors—FIGS. 7A, 7B and 7C

The marker arrays can alternatively be modified, or their operations can be constrained, in a way that allows designation of sectors. This provides a means to derive distributions that are specific to a given sector. The sectors can be delineated in various ways, including: a) choice of a specific order for sampling the elements of the array, b) sorting addresses from array 10 according to the value of the address, c) selective wiring of the array to provide multiple signals. These three alternatives will be illustrated in FIGS. 7A-C.

FIG. 7A shows a raster array 12 wherein the sampling order is systematic, i.e., as is done with TV-type raster scan. In this embodiment the elements of each row are polled, and then successive rows are polled, with the addresses of marked elements being entered into the data stream of a signal 31. FIG. 7A illustrates this with a dashed line that weaves back and forth across the array. This is intended to convey the concept, but does not precisely represent the fact that every row gets sampled. For purposes of specifying the sector in which markers are located, a given row can be sampled from left to right or vice versa.

Because the rows of array 12 are systematically sampled as described above, addresses from the first half of the sequence come from the top half of the array, designated as a top sector 70*a*. Those that were provided in the second half of the sequence are from a bottom sector 70*b*.

If the task is to assess the existence of upper and lower symmetry in a pattern, or the degree of symmetry, this ordered information can be derived by adding a component to array 12 or to processor 40 that computes distances from each sector separately. The resulting distributions are then compared as shown in FIG. 5.

FIG. 7B shows array 10, for which the address sampling process is not strictly controlled, and the marker addresses are delivered into signal 30. For this embodiment a value filter 80 has been added. Filter 80 sorts the addresses according to the sign of the X component of the address. If the X component has a negative sign, the address is routed into a signal 31*a*, and if it has a positive sign the address is routed into a signal 31*b*. This has the result of providing separate signals for a left sector 72*a* and a right sector 72*b*. Again, this embodiment can provide an effective means to evaluate symmetry.

FIG. 7C shows an array 14 in which the sectors have been partitioned with diagonal boundary lines that delineate a sector set 74*a-d*. These sectors have been hard wired for independent sampling. The addresses from each of the four sectors are carried in independent signals, a signal set 30*a-d*, thus making them available to produce separate distribution summaries of each sector. Within a given sector, the order of sampling is not relevant.

Distributions derived from the embodiments illustrated in FIGS. 7A-C can be especially useful for classification and recognition of symmetric manufactured shapes.

Figure 8A:
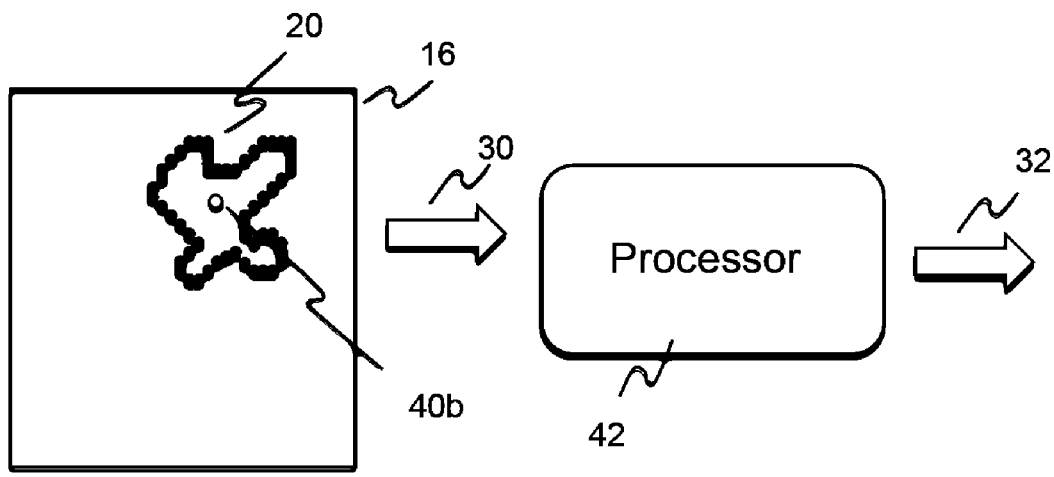
FIG. 8A shows a processor that can specify attribute a convergence hub to any location within a marker array.
Figure 8B:
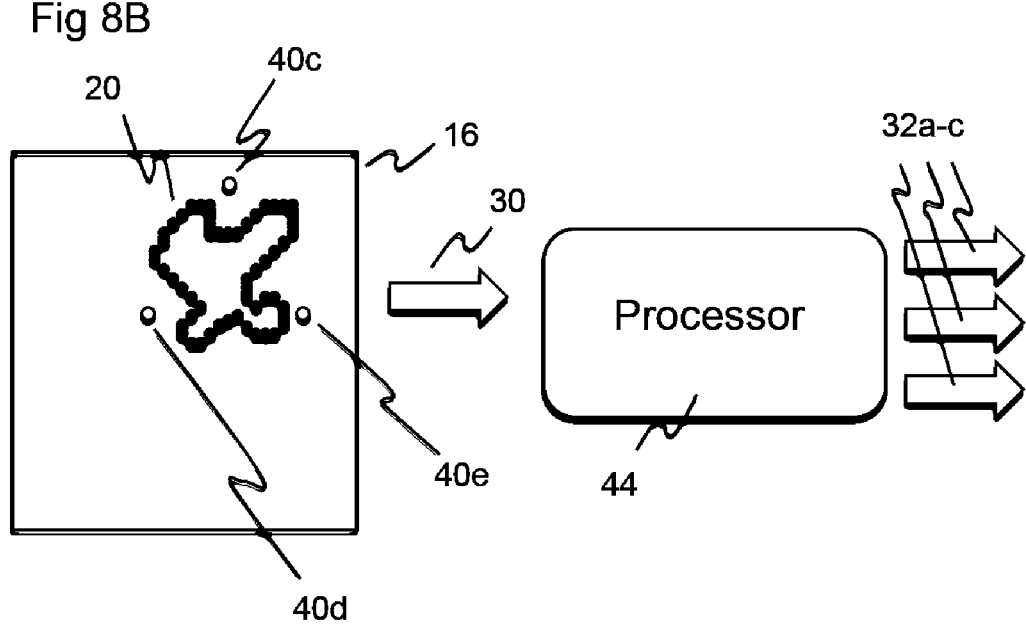
FIG. 8B shows a processor that can specify a plurality of convergence hubs, and provide independent distance measures to each hub.

Providing Alternative Hubs—FIGS. 8A and 8B

If distances are calculated relative to hub 40*a*, which is located at the center of the array, the resulting distribution will change if the pattern is displayed at a different location within the array. This is generally described as "translation" of the pattern, and the inability to identify a pattern that has been translated can diminish the utility of the distribution for recognition of the pattern or other decisions. It is useful be to provide a means to achieve "translation invariance," which requires that the summary of the pattern not change or change very little when the pattern lies at various locations within the array.

One can modify the processor to allow a hub to be placed at any address within the array. When this is done, deriving distances using the Pythagorean theorem requires only a computational adjustment. One can place the hub at the centroid of a pattern, which lies at the mean of the pattern addresses, and the distance values are then be calculated relative to this centroid. Specifically, one calculates the mean of the X component of the address, and the mean of the Y component, and the resulting means provide the address of the centroid.

FIG. 8A illustrates pattern 20 being displayed on an array 16 that has four times more elements than array 10. Array 16 is operationally the same as array 10, and the delivery of addresses into signal 30 does not represent a functional difference in the system. Whereas subsequent processors must be designed to accommodate the increase in array size, the basic operation of each component is unchanged.

For this embodiment, a processor 42 is provided with the ability to calculate the centroid address, and use this location as a hub 40b.

Although pattern 20 is positioned at a location that is eccentric to the center of array 16, processor 42 calculates distance values relative to hub 40b. These are sent to the next processing stage in signal 32, which is not operationally different than the process shown in FIG. 4A. The operation of subsequent components is unchanged, and the distribution that is derived for pattern 20 will be the same irrespective of where it is positioned on array 16 (assuming that all markers of pattern 20 lie on the array). Therefore this system provides translation invariance.

The system is not restricted in the number of hubs that can be used to derive a summary distribution. Deriving distributions using measures taken from more than one hub will provide a benefit for tasks such as pattern recognition, which can be described as providing more than one "perspective" on the pattern. FIG. 8B shows pattern 20 again being displayed on array 16, and with a processor 44 specifying locations for a hub set a-c. These hubs are set at prespecified locations in relation to the calculated centroid address. Distances to marker addresses are calculated by processor 44 in relation to each hub, which are then sent as a signal set 32a-c, which are designated as "multiple-hub distance distributions." Subsequent components are modified to provide three separate distributions for pattern 20. These can be considered as representing the pattern as viewed from the perspective of each hub, which can be formally described as "alternative vantage points."

Enhanced Functions of Value Filter 80—FIGS. 9A-9B

As described above in connection with FIG. 7B, a value filter can be used to sort addresses according to the sign of the value. One can also design the filter to sort addresses depending on the value that is contained, or to sort on the basis of the distance value that is derived from the address. These can be made operational components of a processor. The processor can be designed to do either or both, but for clarity the two alternatives are illustrated as different embodiments.

FIG. 9A again shows pattern 20 displayed on array 16. Additionally, a random set of markers (the black dots) contribute noise that, if included in the resulting distribution, will result in a modified distribution that is not a proper summary of pattern 20. However, by the addition of a value filter 82 (into a processor 46), the system is able to reject most of this noise.

Filter 82 rejects any address that is not within a designated region of array 16, this being shown as a sector 76. Pattern 20 is present in sector 76, but there are also marked elements scattered across the array. If array 16 were processed without benefit of filter 82, the distances to each of these markers will be included in the calculated distribution, and it will not provide a good summary of the pattern. In other words, the markers that are not part of pattern 20 represent "noise," and it is beneficial to eliminate much or all of this noise before creating a distribution from array 16. By providing only the marker addresses that lie within sector 76, the distribution will be based only the pattern contained in this sector, which is designated as a filtered pattern 20a.

FIG. 9B again shows pattern 20 displayed on array 16, but in this embodiment a distance filter 82' has been added as a component of processor 46'. Filter 82' rejects any distance value that is not within a designated distance from hub 40b. Therefore, though all addresses from array 16 have been delivered to processor 46', and it has calculated a distance value for each, only those distances that lie within a specified range will be sent on for distribution. By this means, a sector 76' is specified, and the resulting distribution will be based only on the distances provided within sector 76'. This will correspond to a filtered pattern 20a'.

Although filtered patterns 20a and 20a' still contain markers that are not present in pattern 20, the resulting distributions will likely be a close match to the summary distribution for pattern 20, and a comparison that will be needed for recognition or other purposes will find the correspondence to be acceptable.

FIGS. 9A and 9B also show the unwanted "noise" as a scattered set of markers. However, only the marked elements that are in sectors 76 or 76' will be registered after application of filters 82 and 82', respectively. Thus any number of markers can be present in the regions that have not been designated as sectors, and they will not be included in the resulting distributions.

Alternatively, one can set filter 82 to sort the sectors according to address, and provide processor 46 with the ability to calculate distances from more than one sector.

This method for designating sectors is useful for an iterative search, wherein alternative regions of array 16 are sampled in succession, placing hub 40b in the middle of each sector to be examined. This can be used to find a known pattern, with the contents of array 16 being systematically examined to determine whether the pattern was present. In this case, one can use comparison of distributions that had been sampled against the distribution being sought, and use known methods to evaluate correspondence and guide the search toward a better match.

Filtering for Marker Values—FIGS. 10A and 10C

Thus far, explanations of the system has used only binary values to represent patterns, i.e., the value of the marked element (marker) was either +1 or 0, illustrated with black and white, respectively. The only addresses being sent for processing were those from markers having a value of +1, and therefore the resulting distribution reflected the pattern of +1 markers within the array. However, it is possible to design an array that uses any number of alternative values, with processing operations being modified to either filter out or to separate the addresses according to the marker value.

The basic concept can be illustrated by using an array that allows markers to have three value states—+1, 0, and −1. FIG. 10A shows a portion of array 10, which implements the three states, and shows some elements with a state of +1 (in black) and others with a state of −1 (in white). The elements of the array having a value state of 0 are not shown. These marker states could have been produced by any number of prior-art methods or criteria. For example, the boundary of a blue object could provide the basis for setting a +1 marker, and the boundary of a red object sets a −1 marker. Or one could have the edge of a moving object set a +1 marker, and the edge of a still object set a −1 marker. Any number of alternative conditions could be used to set the marker states; the main issue to be explained is how the pattern provided by those states would be evaluated by my system.

The addresses of array 10d are polled for whether they are in a state other than 0, and if so, the value of the marker and the address of the marker are sent to signal 30e. FIG. 10A illustrates the combined values being provided to signal 30e. As shown, a −1 is appended to the address of each white marker, and a +1 is appended to the address of each black marker. As was the case for array 10 (FIG. 2A), the order in which these combined values are sampled and contributed to signal 30*e* is unimportant.

Value filters can be designed to sort not only on the basis of the value of address components, but can also sort on the basis of the marker value that is provided. FIG. 10B shows array 10*d* with a pattern 20 for which a summary is needed, along with a scattering of white markers that should be excluded from the distribution summary. In other words, the white markers represent potential noise, similar to the conditions illustrated in FIGS. 9A and 9B. A noise filter 84 that discards any addresses that contain a −1 marker value has been added to a processor 46*a*. The only addresses that are processed thereafter are from black markers, i.e., having a value of +1, and the resulting distribution will be as though the array had registered only pattern 20.

FIG. 10C again shows pattern 20 being registered on array 10*d*, but here there is an interest in summarizing the pattern of the white markers, designated as a pattern 22. Summary distributions for both patterns can be effected by adding a sorting filter 86 to a processor 46*b*. Filter 86 sorts addresses according to the marker value, providing those to which a −1 was attached into one set and those with a +1 attached into another. These are treated separately by processor 46*b*, and remain separate through all subsequent stages of processing. The distribution from the +1 markers will again correspond to the distribution for pattern 20, and the distribution from the −1 markers will provide a distribution that summarizes pattern 22. In other words, the action of filter 84' serves to separate one pattern from the other, allowing each to be evaluated for recognition or other task requirements.

FIG. 10C has illustrated a means for simultaneously extracting patterns 20 and 22, and then separating them for simultaneous calculation of distances and distributions. However, this can alternatively be done successively using the components shown in FIG. 10B by first setting filter 84 to discard negative marker values, and then for polling the array and discard the positive marker values.

No hubs have been shown in FIG. 10, as their placement is not relevant to this operation being described. For FIG. 10B, one can use the calculated centroid of the pattern as a hub, given that the addresses delivered out of filters 84 or 86 relate only to a given pattern. Thus for the superimposed patterns of FIG. 10C, one can evaluate each in relation to their respective centroids. Once filter 86 has separated the addresses of each pattern, the centroid of each can be calculated, and hub placement for one has no bearing on how the other pattern is processed.

The operation of filters 84 and 86 have been explained using only three states, designated as −1, 0 and +1. The logic by which these can be combined with the address of each array element, and how a filter can provide for separation of the values for purposes of address computation has been discussed. These operations are not limited to the three value states, as the system can be designed to handle any arbitrary number of marker values.

Figure 11A:
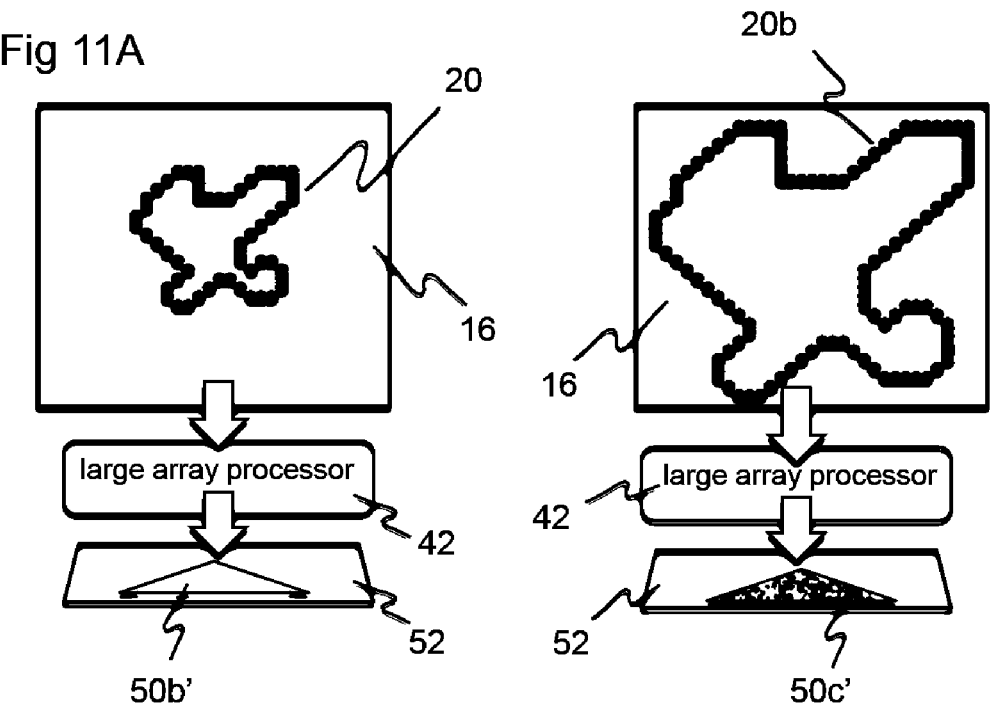
FIG. 11A shows two patterns that differ in size.
Figure 11B:
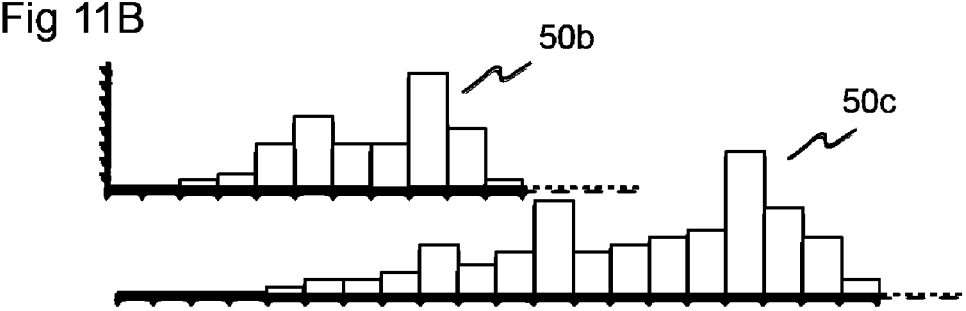
FIG. 11B shows the distributions provided by each pattern.
Figure 11C:
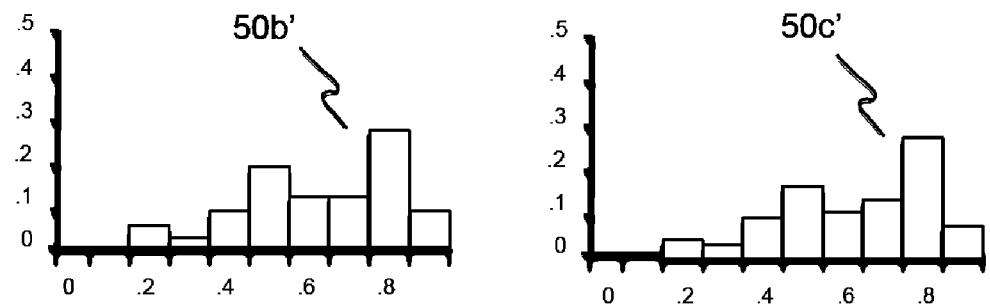
FIG. 11C shows normalizing transformation of the distributions shown in FIG. 11B, which allows for quantitative comparison of similarity.

Transforms of the Distribution—FIGS. 11A, 11B, and 11C

The basic method for distributing distance values was illustrated in FIGS. 4A-C. There, and in subsequent illustrations, the values on the horizontal axis (the abscissa) corresponded to the distances that were calculated, and the vertical axis (the ordinate) specified how many times a given distance was observed. However, the utility of the distributions can be greatly enhanced by applying various transforms to the distribution values. The new operations can compensate for differences in size of the pattern, adjust for the number of markers, and adjust the resolution of the distribution. The basic methods for doing the various transformations are illustrated in FIGS. 11A-C and 12A-B.

In FIG. 11A, pattern 20 is shown on the left, and a much larger pattern 20*b* is shown on the right. Pattern 20*b* has twice the number of markers as pattern 20, but most humans will judge the two to have the same basic shape, differing only in scale.

Processor 42 computes the distances that are provided by each pattern, relative to a centroid hub (not shown), and a distributor 52 calculates distributions 50*b* and 50*c*. Distributor 52 differs from distributor 50 only by being able to handle a larger array. This was not illustrated previously, when the operations of distributor 42 were being discussed in conjunction with FIG. 8A.

FIG. 11B shows distribution bins as integer values, this being the same as in previous illustrations. Pattern 20 makes use of the same number of bins as was required in FIGS. 5A-C, given that the distances within the pattern are no different whether the array itself is large or small. There are many bins to the right of distribution 50*b*, but these all have values of 0 and therefore the scale has been truncated in the illustration.

Pattern 20*b*, being much larger, adds counts to a larger number of bins, as shown in distribution 50*c*. Further, there are twice as many markers, so the sum of bins heights for distribution 50*c* is twice that of distribution 50*b*.

Distributor 52 has tools for transforming the distributions so that they can be compared. The difference in number of observations, i.e., number of markers, is adjusted by making the area of each distribution equal to 1. This is calculated by having each observation be the decimal value that is one divided by the number of observations (markers) for the distribution being considered.

To adjust for differences of size, the full range of each distribution is partitioned so that the number of bins is equal for each. The number of bins is arbitrary, but it is common to use 10, and to consider the full range of the distribution as lying between 0 and 1.0. This is commonly described as "normalization."

Without these transforms, it will be difficult to compare distributions 50*b* and 50*c*. With the transforms, one can see that distributions 50*b*' and 50*c*' are similar, and formal comparison of the two can provide a basis for ignoring size differences and concluding that pattern 20*b* is the same pattern 20.

Because some of the most useful distributions have been transformed, one can no longer describe the scale of the horizontal axis as providing "intervals of distance." Therefore hereafter the more general term "abscissa" will be used, keeping in mind that the scale values of this axis will always specify those distances or be proportional to them. In like manner the term "ordinate" will be used to describe the vertical axis of the distribution, with the understanding that the ordinate values will specify either the number of distance observations or a value that directly relates to this number.

Figure 12A:
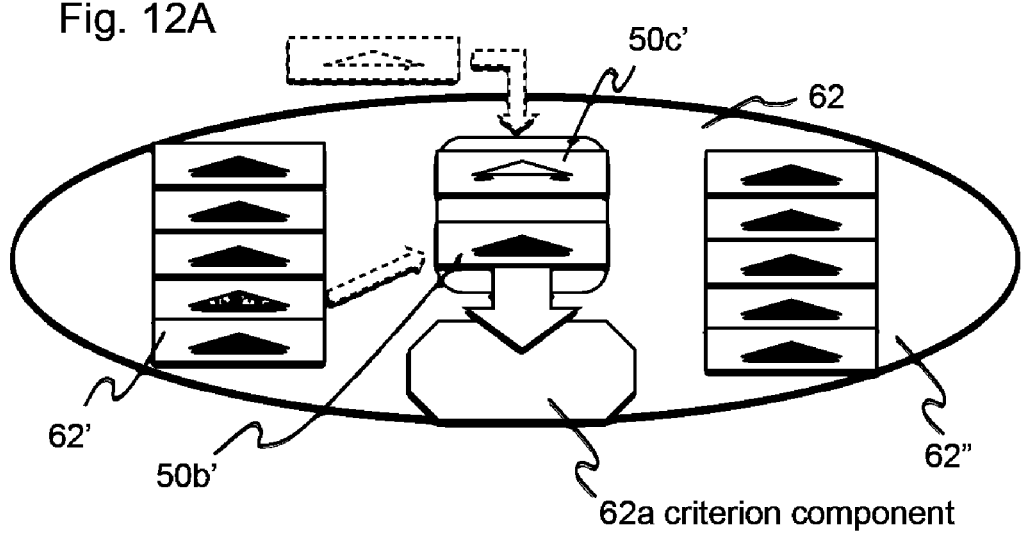
FIG. 12A shows a comparator to which memory has been added, allowing for recognition of an unknown pattern.
Figure 12B:
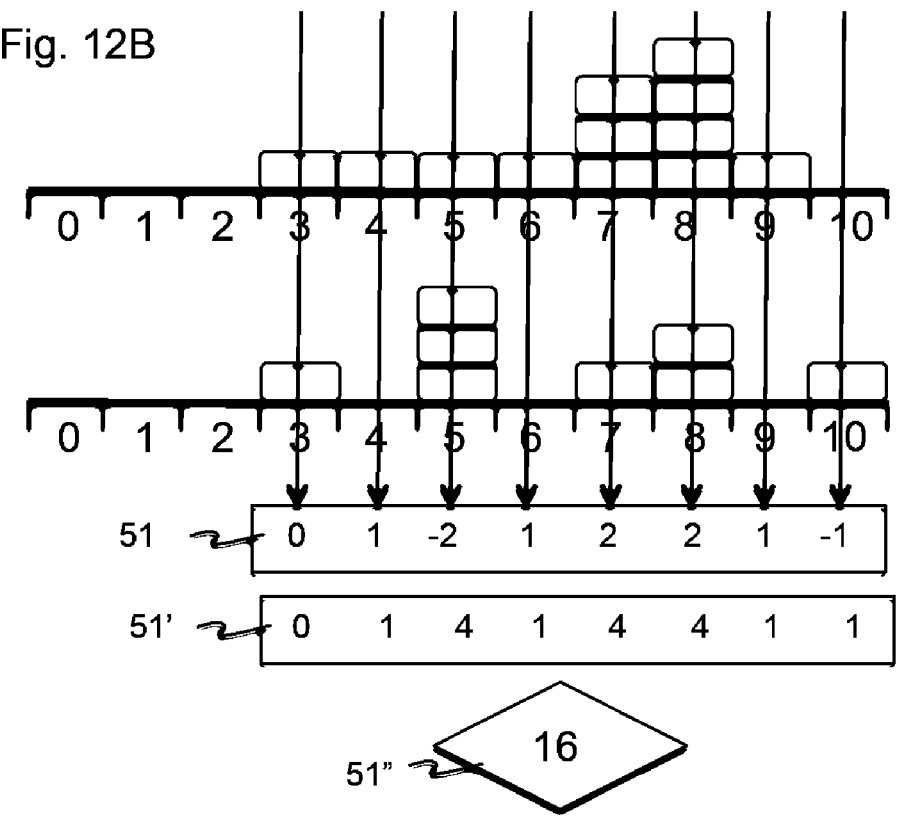
FIG. 12B shows how a sum of squared differences is computed for two distributions.

Expanded Functions of the Comparator—FIGS. 12A-B

Comparator 60 (FIG. 5) has enough memory to store only one distribution, which allowed comparison to a second distribution that was provided at a subsequent time. Many applications will require substantially more memory, making it possible to recognize whether a new unknown shape is a match to any that had been previously stored.

FIG. 12A shows a comparator 62 to which a substantial amount of memory has been added, this being identified as memory sets 62' and 62". The figure shows that each memory buffer holds a distribution that has been derived from a known pattern. Each is labeled by number or name so that it can be referenced. Comparator 62 is designed to successively sample each buffer in the memory set (as specified below), and compare the distribution that is stored with an unknown distribution. For most purposes the comparison will make use of normalized distributions, and so a distributor 52 is provided as the distribution source, and all subsequent system descriptions assume that the distributions have been normalized.

For convenience, in FIG. 12A we use distribution 50*b'* as the known distribution, with distribution 50*c'* being unknown, and thus requiring comparison in order to be identified.

FIG. 12A shows that distribution 52*c'* has been passed into comparator 62. It also shows that distribution 52*b'* has been transferred from memory into a central location to provide for comparison of the two distributions. Although the illustration suggests that distribution 52*b'* has moved out of memory, most systems will make a copy of the memory buffer instead.

Comparison of two distributions will generally be done by calculating a quantitative index of similarity, such as the sum of squared differences (SSD). This is a basic function of comparator 62, but deriving this value does not in itself provide a final decision about identity. That decision will depend on the degree of similarity of alternative distributions and a number of other factors. A decision process must be added that affirms identity on the basis of the size of the comparison value, e.g., the SSD. In FIG. 12A this operation is provided by a criterion component 62*a*.

To calculate a sum of squared differences, one determines the difference in value at specified intervals within the distribution (bin positions in the present case), squares those differences, and then adds together the squared values to derive a net sum. The SSD method is illustrated in FIG. 12B using simplified distributions. The distributions are again shown with placement of tokens, forming stacks that represent the number of observations at each distance. To compare the two distributions, the difference in heights (number of tokens in the stack) is determined, shown in FIG. 12B as a value set 51. The values in set 51 are then squared, shown as a value set 51'. These squared values are summed across all bins, totaling 16, which is the SSD (identified as a value 51").

The SSD value is used as an index for how different one distribution is from another. If the two distributions are identical, then all differences will be 0, and the SSD will be 0—perfect identity. As the distributions grow less similar, the value of the SSD increases. Therefore the size of the SSD becomes a quantitative method for specifying similarity of distributions, and makes it possible to formulate criteria for recognition.

In comparing the distribution of an unknown pattern with distributions that are in memory, comparator 62 can use the size of the SSD to determine how to label the unknown pattern. In general the process will successively compare the unknown distribution against every distribution that was stored. One can provide for an early termination of the search if or when an SSD of zero was registered. In fact, to allow some tolerance for minor defects in the pattern, one can choose to set a threshold, below which the value was considered equivalent to zero, and an unknown distribution will be declared to be a match to the known distribution. If all values being returned were above such a threshold, then the search of memory continues until the unknown distribution had been compared to all stored distributions. This threshold value can be derived from the minimum SSD scores for any two different shapes in the known set.

If a search was completed without finding an SSD of zero, one has the option of declaring the unknown shape to be "not identified"—thus remaining unknown. Alternatively, for many applications the goal is to find the "best match" or even an assessment of degree of similarity. The quantitative measures provided by SSD allow for either. Best match will be to the lowest SSD that was observed, and degree of similarity is reflected in the size of the SSD. One can order the known patterns by the size of the SSD, and have a ranking from most similar to least similar in relation to the unknown. Alternatively, if one had evaluated a set of unknowns, the sizes of the SSDs can reflect degree of similarity to a known distribution.

A good alternative to the SSD comparison is the Chi Square test, which squares the difference for each bin position (as is done with SSD), but then forms a proportion with the height of each distribution at each bin position. The proportions within and across bins are summed, and as with the SSD, greater similarity of the distributions is indexed by lower Chi Square values.

Bin Adjustment to Focus on Global Attributes—FIGS. 13A to 13D

A pattern may fail to be identified because it has been degraded in some manner. FIG. 13A shows pattern 20*b* in the left panel, and in the two panels to the right one can see a pattern 20*c* and 20*d* which most humans will judge as being similar. In pattern 20*c*, many of the markers have been moved one position, so the boundary appears more ragged than does the boundary of pattern 20*b*. Pattern 20*d* shows only every other marker, which can be described as a "sparse" sample of pattern 20*b*.

FIG. 13B shows the normalized distributions that have been derived from patterns 20*b-d*. If these were submitted to a test for recognition, where the comparator needed to determine similarity of these in relation to a great many other possibilities, it is likely that distribution 50*d'* and distribution 50*e'* have not provided a sufficiently low SSD for identification. In other words, the distributions can thus be judged as not matching distribution 50*c'*.

The chances for a non-match will be especially great for pattern 20*d*—the sparse sample—because the removal of half the markers substantially reduces the information that is provided by the pattern.

FIG. 13C shows a distributor 54 and a comparator 64, which interact to provide an enhanced function called bin adjustment. For this process, one alters the number of bins into which the distance values are distributed. Providing fewer than the ten that is commonly used for normalization has the effect of focusing on global attributes of the pattern, and can increase the chance of recognition when the pattern is degraded in various ways.

One can use bin adjustment as a method for validating a decision that was based on the SSD. Rather than accept the lowest value as providing the correct match of an unknown distribution to a stored distribution, the distributor can accept several low-scoring candidates, then solicit adjustments of the bin number (a function being ascribed to distributor 54). The decision criterion can be based on the combined evaluation of the original distribution and also one or more distributions having different bin numbers. The more comprehensive analysis of alternative distributions will provide a more solid basis for determining identity of the unknown sample.

If abundant memory is available to the comparator, storing one or more alternative distributions, each using a different number of bins, can provide for classification of shapes that makes the search of memory more effective. In comparing an unknown pattern, one first uses distributions that use relatively few bins. One sets a range of SSD above which a mismatch is declared, and one can eliminate the need to include any comparisons of any normalized distributions from which the mismatched low-bin versions were derived.

The comparison values provided by SSD and Chi Square serve as indices of similarity for a given pair of shapes. One can cross-tabulate those values to group shapes according to similarity. This is especially useful for searching a large inventory, as the results of an initial comparison can immediately determine whether a large group of shapes should be further searched, or ruled out as being a poor match the unknown shape being evaluated.

Figure 14A:
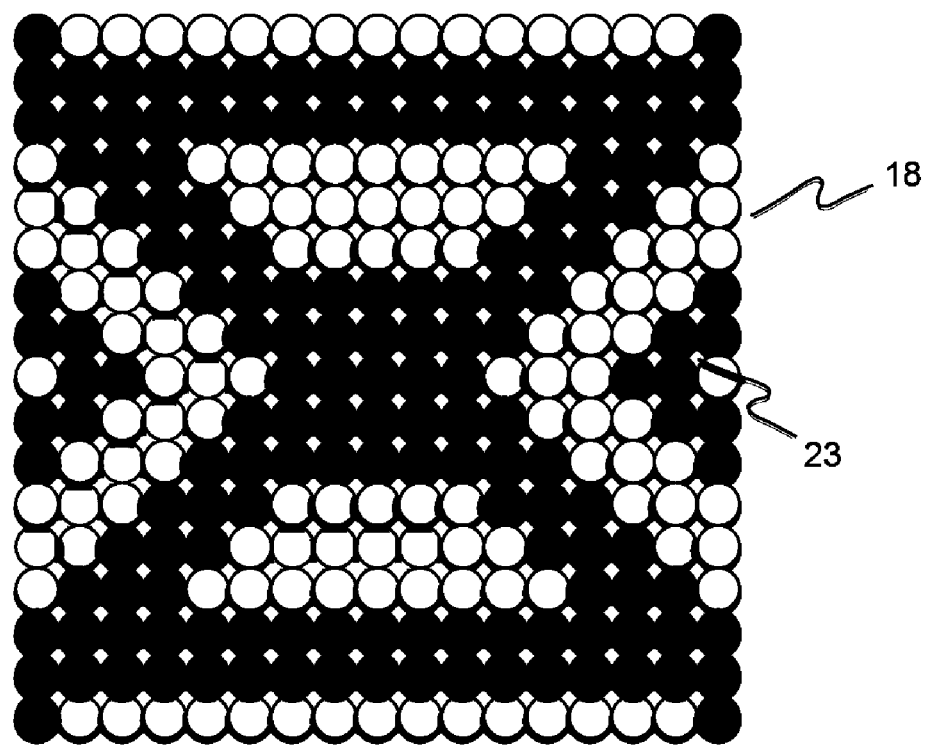
FIG. 14A shows a pattern that is formed by a pattern having five levels of brightness.
Figure 14B:
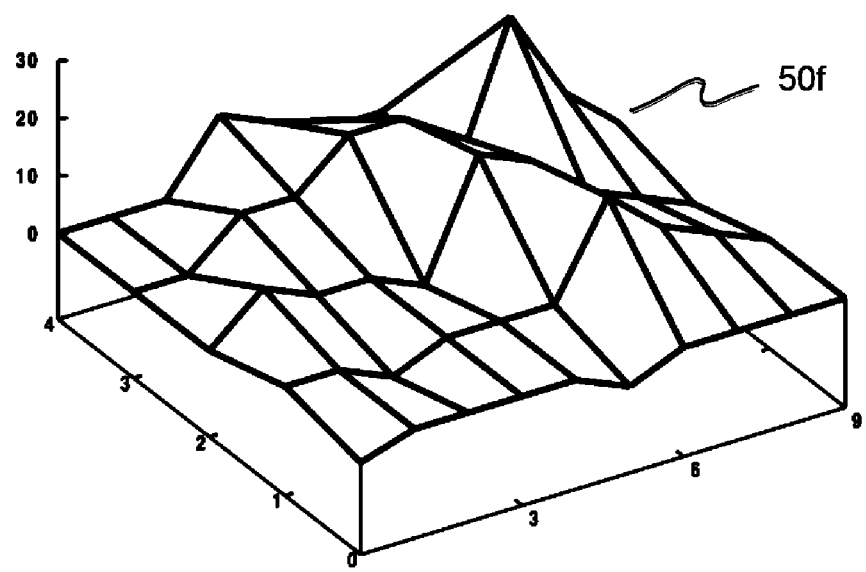
FIG. 14B shows a 3D distribution of the number of observations at each brightness and distance.

State Levels as a Quantitative Factor—FIGS. 14A and 14B
Rather than filter to select a single marker state, as was illustrated in FIG. 10A, or provide alternative distributions depending on state, as illustrated in FIG. 10B, one can use quantitative measures of state as a factor in combination with distance. FIG. 14A illustrates an array 18 for which the elements can vary in brightness. The elements are marked with a pattern 23, which reflect five levels of brightness that range from black to white.

One can derive five different distributions, one for each state (brightness level) that was manifested, and use all five to provide a combined summary of the pattern. However, the distribution values can also be shown in a 3D distribution that has brightness level on one axis, distance on another, and then specifies the number of elements that manifested a given brightness at each increment of distance. FIG. 14B provides this as a distribution 50f, with the distance scale being shown on the right and the brightness scale on the left. Such distributions can be used for comparison among alternative patterns in a manner that is virtually the same as for 2D distributions, and the methods are well known to those skilled in the art.

Figure 15:
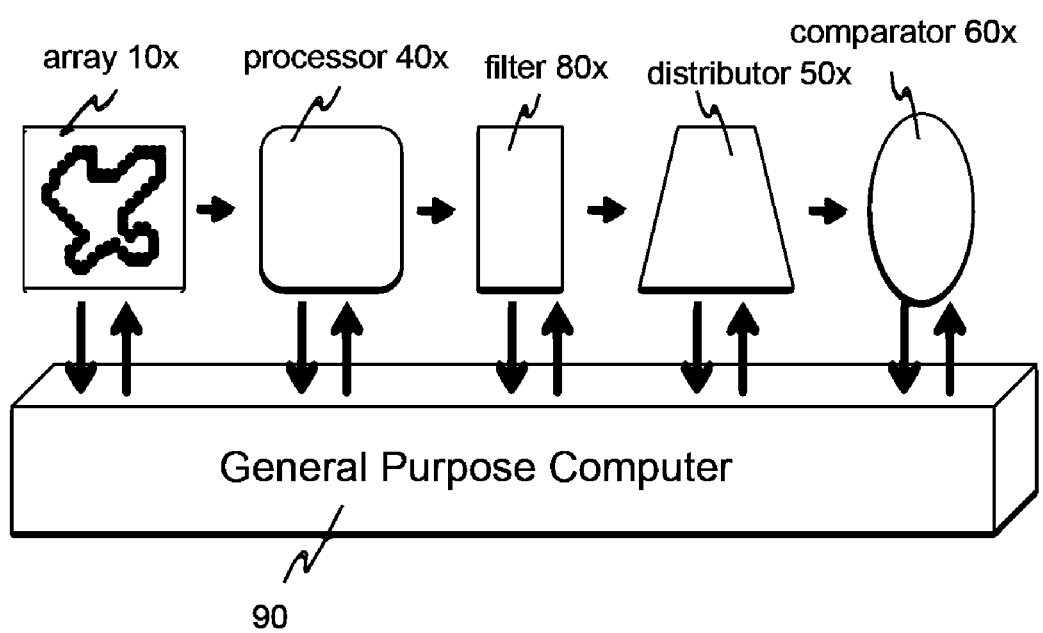
FIG. 15 shows components of the system, with a general computer being used to supplement or replace computational steps of any or all components.

Implementing the System with a General Computer—FIGS. 15, 16A and 16B

A more general computer can be used for calculating values and storing values at any point in the system. FIG. 15 illustrates a system comprised of system components 10x-80x, each having unspecified computational and storage deficiencies. Any or all of the components can be supplemented by the addition of a general computer 90, which uses instructional programs, i.e., software, to accomplish what is required of a given component. This can include conditions wherein the entire operation of the component is accomplished by means of computer 90. The implementation of this hybrid arrangement can be easily accomplished by those skilled in the art, given the information that is provided above and below.

As implemented in software, the operations divide into two major categories—constructing a distribution of distances, and comparing one distribution with another. The most effective method for constructing a distribution is to perform all processing steps with respect to the address, distance calculation, and bin count for a given marked element before going to the next marked element. FIG. 16A illustrates these steps for the first embodiment. A step 92a initializes the bin count of the distribution, meaning that all ordinate values are set to zero. A step 92b retrieves a marker address, and a step 92c applies the Pythagorean theorem to the address values to derive the distance to the center of the array. This distance value is added to the distribution by a step 92d, i.e., the corresponding bin count is incremented by one. A step 94e evaluates whether all markers have been sampled, and if not, one returns to step 92b to repeat the process. If all markers have been examined, a step 94f calls the process to a stop.

FIG. 16B illustrates the steps involved in comparing a distribution A with a distribution B using a sum of squared differences (here identified as "sum"). A step 94a retrieves the two distributions; a step 94b sets the initial sum to zero and registers the count from the first bin of each distribution. A step 94c subtracts the count from the B distribution from the count provided by the A distribution, and a step 94d squares this value and adds it to the sum. A step 94e determines whether all bins in the two distributions have been evaluated, and if not, a step 94f is executed, which asks for values from the next bin position, and then repeats steps 94c-94e. If step 94e determines that all bins have been process, a step 94g calls the processing to a stop.

The attached ASCII file, titled "ProgramListing2.txt," contains a source code listing for the Tcl programming language, demonstrating an implementation of each illustrated component or operation on a general-purpose computer. To run these examples, load the code into a Tclsh interpreter, and invoke individual commands as described in the comment statements.

Proof of Utility for Recognition—FIGS. 17, 18A, 18B, 19A, 19B and 19C

As described above, the system provides a method for recognizing an unknown shape. An elementary yet challenging requirement is the identification of common shapes in which only the outer boundary is provided, similar to a silhouette. The interior of the shape provides no information, and most efforts to formulate recognition protocols have focused on the path of the boundary itself, what can be called the collinear attributes of the boundary, such as orientation, length and curvature. However, I have provided evidence in studies of human perception that these attributes are not essential for recognition (op cit.). My evidence suggests that discrete markers that are placed along the boundary can be separately evaluated by a system that combines metric information, i.e., distances, to provide a summary that can be used to identify the shape.

The present system specifies a particular method of summary of metric information, this being the distance from each marker to a chosen location, specifically the convergence hub as described above.

Figure 17:
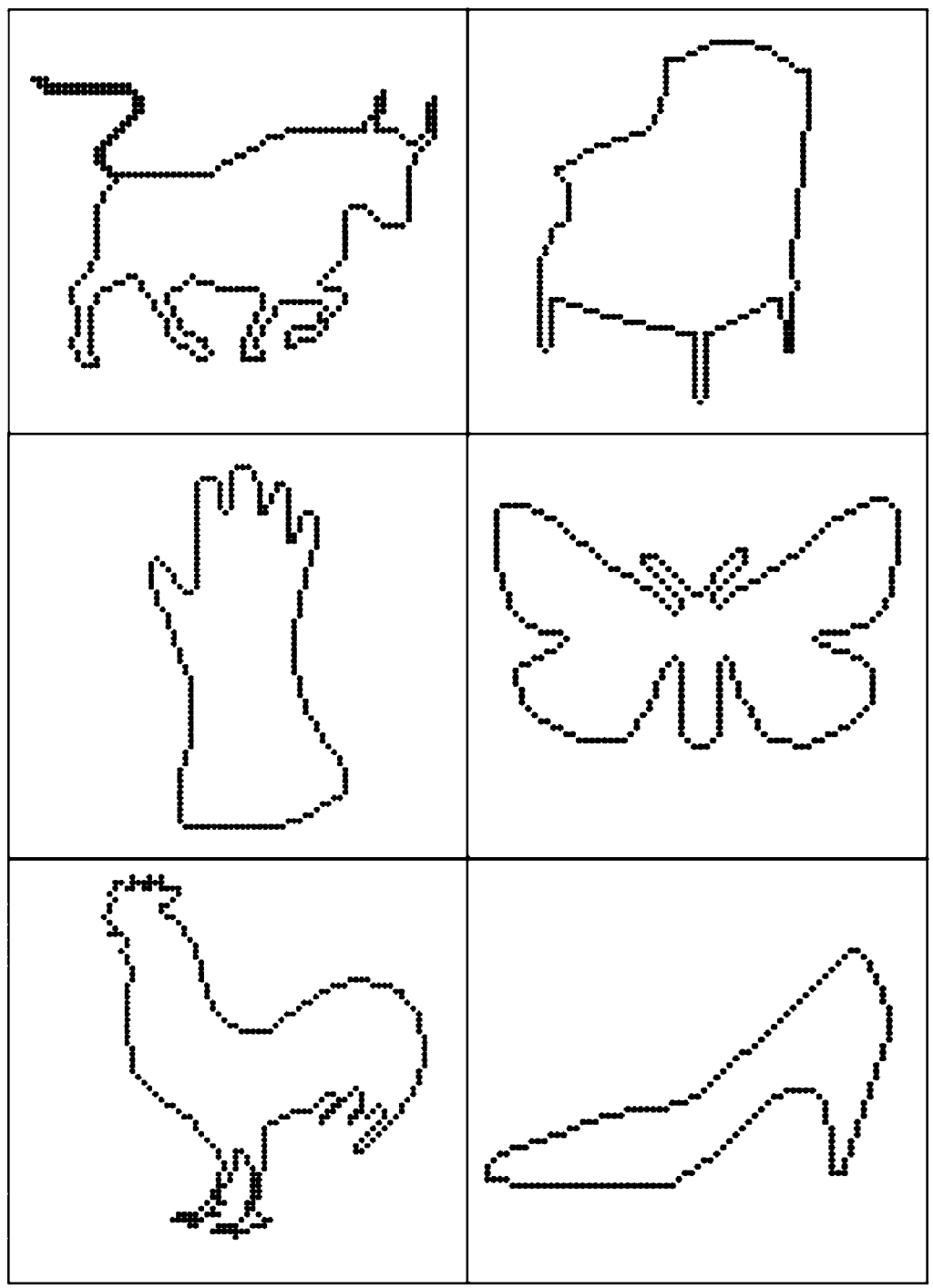
FIG. 17 shows examples of shapes used to prove utility of the system.

The effectiveness of the system was tested using 150 shapes that were represented as marked positions on a 64×64 array. The shapes depicted mammals, birds, insects, tools, articles of clothing, furniture, vehicles and other objects that human subjects were able to identify with the outer boundary being shown as discrete dots. The panels of FIG. 17 show a sampling of these shapes. The elements in the underlying array are not packed tightly, and thus do not touch, but this is irrelevant to the method for summarizing the marked pattern. All shapes were sized to span the full array in either the vertical or horizontal direction, and unmarked elements are not shown in the illustration.

Evaluation of the present system was done as a simulation using a general computer, with the location of marked elements being specified in an address table. These addresses were treated with a simulated processor 42 (FIG. 8A), which calculated the centroid for each shape and designated this as hub 42b (FIG. 8A).

Distances from each address in a given pattern to hub 42b were calculated, and a simulated distributor 54 (FIG. 13C) provided a distribution. This distribution was stored in a simulated comparator 64 (FIG. 13C), with the process being repeated until distributions from all 150 patterns were stored. This inventory is described as "known shapes," meaning that each stored distribution has been given a name.

Recognition was tested by choosing a pattern that was designated as the "unknown shape." A distribution was derived as specified above, and was compared against the inventory of known shapes. Comparison was made using the sum of squared differences (SSD, see FIG. 12B), which provided a basis for deciding on shape identity, and also the Chi Square test to see which was most effective.

The goal is to compare an "unknown shape" against the inventory of distributions for known shapes, and to use the lowest comparison value (SSD or Chi Square) for deciding its identity. A comparison of the known shapes against the stored inventory (22,201 pairings) found that correct matches were the only ones providing a score of zero with either method of comparison. This affirms that for these 150 shapes, all distributions were unique.

The stored distributions can be used to determine whether an unknown shape was a match to one of those in the inventory. Any pattern that failed to generate a zero for SSD or Chi Square tests is not among the stored shapes.

An even better challenge is to determine whether the system will "recognize" a shape in which some of the marked elements had been removed, similar to the illustration in FIG. 13A. This was tested by removing either 50% or 75% of the markers from each shape in the inventory of 150 shapes.

FIG. 18A illustrates the alternative patterns for one of the shapes, with a pattern $24a$ providing a full complement of markers, a pattern $24a'$ providing every other marker, and a pattern $24a''$ providing every fourth marker. Although humans will judge these three patterns as being very similar in shape, it is not a foregone conclusion that a pattern-recognition protocol will judge them to be comparable.

FIG. 18B provides the normalized distributions that were derived for patterns $24a$, $24a'$, and $24a''$, which are identified as distributions $52a$, $52a'$ and $52a''$.

The full inventory of known distributions are designated as $52x$, with "x" being a variable. The unknown distributions that provide every second dot are designated as $52x'$, and those providing every fourth dots are designated as $52x''$.

Each unknown distribution $52x'$ was compared against each stored distribution $52x$, providing 150×150=22,500 pairings. Correct identification was provided for 147 of the 150 shapes using SSD, and for 146 of the shapes using Chi Square.

Comparison of each unknown distribution $52x''$ against each stored distribution $52x$ yielded correct identification on 126 and 129 (out of 150) for SSD and Chi Square, respectively.

There were only 3-4 errors for the 150 shapes (22,500 combinations) where the unknown shape contained only 50% of the original boundary markers. This suggests that for a task in which speed of response is at a premium, and a small error rate is acceptable, the one-sector method will be useful. However, when this number of markers was reduced to 25%, almost ⅙ of the shapes were misidentified. These results suggest that this particular embodiment will not be useful if the task required recognition of extremely sparse shapes.

Figure 19A:
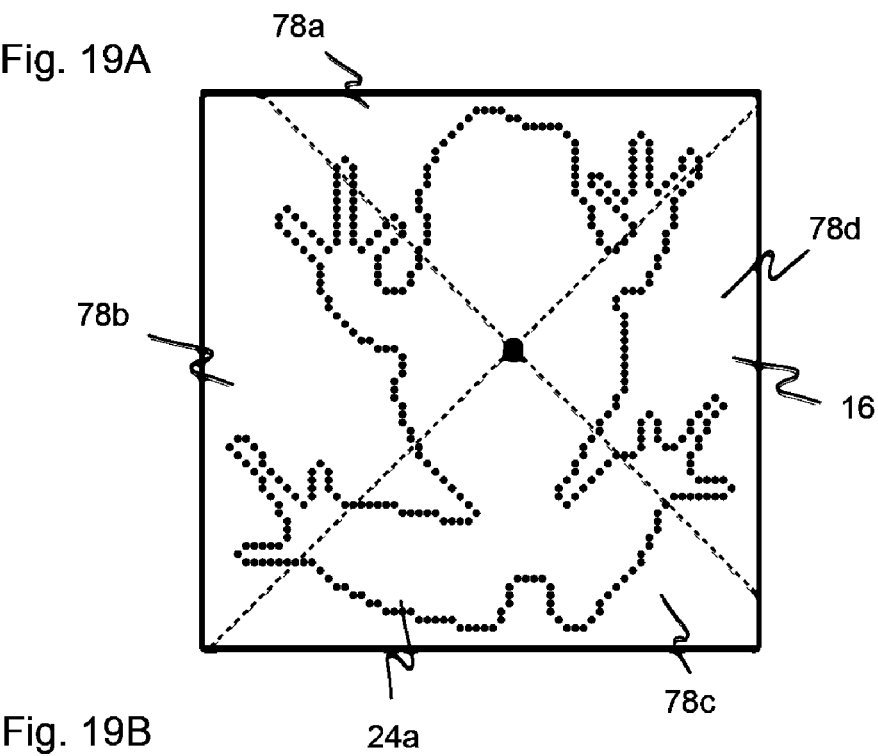
FIG. 19A shows the "known" shape of FIG. 18A, wherein the centroid of its pattern has been specified as a convergence hub, and sectors have been specified in relation to that centroid.
Figure 19B:
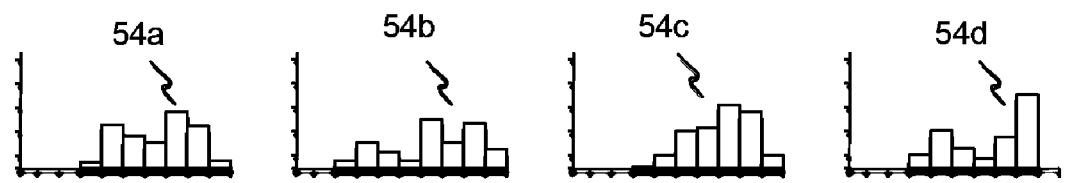
FIG. 19B shows normalized distributions that were derived from each of the four sectors shown in FIG. 18A.

Another test of the 150 shapes was done using a simulated processor 46 (with simulated filter 82-FIG. 9A), which designated sectors $78a$-$d$ on each side of the centroid address. The sectors are illustrated in FIG. 19A, again using pattern $24a$ as the example. Distributions $54a$-$d$ were derived from the four sectors, as shown in FIG. 19B, and these were stored in memory.

Figure 19C:
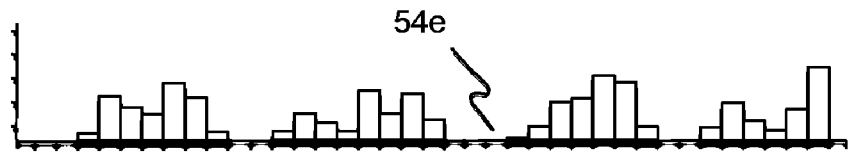
FIG. 19C shows a distribution that summarizes the pattern of FIG. 18A, produced by combining and renormalizing the distributions shown in FIG. 18B.

As shown in FIG. 19C a combined distribution was formed by placing distributions $54a$-$d$ end-to-end, forming a composite distribution $54e$. The amplitudes of distributions $54a$-$d$ were normalized so that when combined, the amplitudes in distribution $54e$ summed to one.

The full inventory of combined distributions for known shapes is designated as $54x$, with "x" being a variable. Each unknown that provided only every other dot is designated as $54x'$, and each that provided every fourth marker was identified as $54x''$. The combined distribution for the frog is shown in FIG. 19C, but the other 149 distributions are not illustrated.

Each unknown distribution $54x'$ was compared against each stored distribution $54x$, again providing 22,500 pairings, and these were evaluated using SSD and Chi Square tests. Correct identification was provided in all comparisons using SSD as well as with Chi Square.

Comparison of each unknown distribution $54x''$ against each stored distribution $54x$ yielded correct identification on all but two shapes using SSD, and for the Chi Square comparison every shape was correctly identified.

As additional evidence that minimal bin distributions can provide for effective recognition, the 150 shapes were re-binned to provide sector distributions with just three bins (the composite distribution having twelve). Recognition was perfect (no mismatches) when the test compared the 150 $52x'$ distributions against stored distributions, and also when the 150 $52x''$ distributions were evaluated. This represents 45,000 pairings, with no misidentification of the unknown shape.

These results suggest that providing separate sector distributions makes it possible to identify diverse shapes even when the unknown sample provides corrupted and minimal information about the location of the pattern markers. This level of recognition is actually better than what humans can do if they were asked to name the shape, and is far better than what known pattern-recognition algorithms have been able to accomplish.

Providing Distributions Based on Address Values—FIGS. 20A-C, 21A-C, 22A-C & 23

Subsequent to filing Application #12233381, I have found that fairly successful identification of the 150 shapes discussed in the previous section can be accomplished using distributions of address values.

FIG. 20A illustrates the most basic embodiment. The basic operation of the marker array is the same as for the simplest embodiment, illustrated in FIG. 2, wherein the address values of markers have been delivered into signal 30. But for the present embodiment, a distributor 56 has been configured to directly accept the address values being provided in signal 30, and to distribute the absolute values of X and Y components into a summary distribution that is delivered in a signal 36. FIG. 20B shows that this embodiment eliminates the need for processor 40, in that the address values are not used to calculate the distance to a convergence hub. FIG. 20C shows the summary distribution 58 that has been constructed from the address components, and is delivered by signal 36 to subsequent system components.

All subsequent operations of distribution and comparison are unchanged. One would standardize, e.g., normalize, the structure of distributions that have been derived from alternative patterns using methods that have been described above. However, it should be emphasized that here one is not using direct distance to a convergence hub. Rather, the X component of the address specifies horizontal distance to the vertical axis of the coordinate system, and the Y component specifies vertical distance to the horizontal axis of the coordinate system. Distributor 56 does not differentiate as to whether the value relates to horizontal distance or vertical distance, it simply registers the absolute value of each address component and attributes that value to a bin of the summary distribution.

FIGS. 21A and 21B illustrate that the distributor can be modified to separately process the X and Y components of the address, and this method eliminates calculation of distance to a convergence hub. Here again, the absolute value of the address component is used, and distributor 56' sends two "component distributions" to the next processing state—one for the X component and another for the Y component. These distributions are carried in signals 36x and 36y, respectively. To get a suitable summary of the pattern, the two component distributions need to be combined into a summary distribution 58', as illustrated in FIG. 21C.

Combining the two component distributions into the summary distribution can be done by the comparator, or by the distributor prior to output. If the latter method is employed, only one output signal from the distributor would be needed. Also, even if the task is left to the comparator, only one output signal is needed if the two component distributions are sent in sequence. The only reason for showing two output signals is to emphasize that this embodiment calls for construction of separate component distributions for the X and Y address components, and only after doing so are the two combined to form a summary distribution.

FIGS. 22A-C illustrate the same concept, as for FIGS. 21A-C, except that here the component distributions that are created by distributor 56" are based on signed address components. In other words, a separate component distribution is constructed for –X, +X, –Y and +Y. These component distributions are combined into a summary distribution 58", and this summary distribution has been normalized to provide consistent scaling. This method has much in common with the earlier method for partitioning the array into sectors, as illustrated in FIGS. 19A-C.

As with the distance to hub methods, one provides for translation invariance by adjusting address values in relation to the centroid of the pattern. One designs the marker array or the distributor to subtract the address of the centroid from each marker address, with the X component being adjusted by the X of the centroid, and the Y component being adjusted by the Y of the centroid. As illustrated in FIG. 23, this functionally results in a shift of the coordinate system, such that all adjusted addresses lie on a new coordinate system that has the centroid at its center.

To be specific, FIG. 23 shows pattern 20 being placed at an arbitrary location on the large array 16. The calculation of the centroid requires that all original marker addresses be averaged, i.e., deriving the mean of all Xs, and the mean of all Ys. This provides the address of centroid 100. The X and Y components of the centroid address are then subtracted from the corresponding components of each marker address. This results in adjusted address values for each marker, each address specifying the position of the marker in relation to axis lines (100x and 100y) that pass through the centroid.

All subsequent steps for use of the adjusted addresses are the same as described above, in that one can use any of the three methods that are outlined in FIG. 20A-C, 21A-C, or 22A-C for summarizing the pattern. The major benefit of this adjustment is to provide a summary distribution that remains the same irrespective of where the pattern was positioned within the array.

Effectiveness of recognition using these address-based summaries was evaluated for the 150 shapes described above (FIGS. 17 through 19C), and error rates were comparable. For example, the four-sector summary method illustrated in FIGS. 19A-C was compared with the signed address method illustrated in FIGS. 22A-C, providing a comparable total number of bits for each summary distribution. Error levels for the two methods were similar using either sum of squared differences or Chi Square tests.

The computational steps required to use summaries based on address values rather than distances to a convergence hub are provided in the updated listing, titled ProgramListing2.txt.

CONCLUSIONS, RAMIFICATIONS, AND SCOPE

The various embodiments of the present system allow more effective discrimination, classification, and recognition of shapes and patterns. The components and operations required to implement the methods are extremely simple, which allows embodiments that are fast, require less power, and are less expensive. Further, the methods provide translation invariance and size invariance, meaning that one can identify shapes and patterns irrespective of their location or differences in size. The summaries are robust, which allows recognition of shapes and patterns that have been degraded or in which the much of the contour information has been eliminated. The methods allow reduction or elimination of noise, and separation of one class of pattern or shape from another.

Comparison of summary distributions from separate sectors provides a means to judge symmetry of the shape or pattern, and comparison of alternative distributions allows discrimination among patterns and shapes. The provided by alternative distributions provides a basis for classifying them, thus allowing a more efficient memory search. And the comparison of an unknown distribution against a set of known distributions allows for recognition of unknown patterns.

The use of a distribution for summarizing the pattern provides much greater efficiency, as it reduces the redundancy within the pattern and allows transmission and storage of far fewer values. This is especially important with large patterns that are provided with high resolution on large arrays.

The distributions can be evaluated using known methods, e.g., SSD or Chi Square test, to provide quantitative indices of similarity, and to set flexible and effective criteria for discrimination, classification, and recognition.

Compared to other known methods for pattern recognition, the present system is extremely simple. It can be done using a minimum of operational steps, and requires relatively little information to be stored.

While the various embodiments of the present system have been described with specific parameters, these should not be considered limiting, as many variations and ramifications are possible.

For a task that required high speed, low power consumption, and small memory load, a simple marker array having a fixed hub at the center and having no sectors is a more efficient choice.

If identification of the shape were required irrespective of size and location within the array, one can calculate alternative hubs, with the centroid of the pattern being an especially effective location for the hub. The shape is also invariant to rotations about that hub.

If one needed to recognize a shape or pattern from among hundreds (or thousands) of alternatives, and where the unknown shape is degraded or sparsely sampled, a complement of sectors can be more effective, and/or multiple hubs. Which alternative to choose depends on the task to be accomplished.

A major finding in the test of 150 shapes, described above, is that recognition can be reliably accomplished using a four-sector summary with the hub attributed to the centroid. For this evaluation, all the shapes were sized to have horizontal or vertical spans that matched the dimensions of the array. However, the use of a summary that has been done relative to the centroid, and with dimensions of the distribution being normalized, identification of the shapes can be accomplished on a much larger array, or with translation or size changes, as illustrated in FIGS. 8A and 11A-C. Further, the system was effective for recognition of sparsely sampled shapes, as illustrated in FIGS. 13A-D, and was effective using only three bins for each sector.

The ability to summarize a shape or pattern as a one-dimensional distribution has numerous advantages. Compared to other known methods of summary, the computations are extremely simple and flexible. The system can be applied to any shape or pattern that differentially marks positions within the array. The means for comparing distributions for similarity are well understood, as are the transformations that can be used to characterize particular features of the distribution or provide for purposes of more efficient memory search. Such transformations modify the scale of the ordinate and/or the abscissa of the distribution, and any such modification is within the scope of the encoding method. The concept of "modification of scale" includes rebinning For example, it has already been noted that separate sector distributions can be compared to determine the degree of symmetry. The inventory of known patterns stored in memory can be classified according to that index, and initial search steps can be based on the symmetry index that was registered by an unknown pattern.

Using known methods, one can also process the distribution for periodicity, and classify the stored distributions using an index of periodicity. This is especially useful for applications where the patterns being examined had substantial regularity across the array.

Many summary distributions, especially those derived from a much larger marker array, will have large gaps, where a series of bin positions have all registered a zero. Here one can apply known data compression methods to provide a summary that speeds transmission and demands less storage capacity.

The relative simplicity of providing a single summary distribution based on distances to a convergence hub will be especially useful for embodiments designed for "smart cameras." Here the system design calls for circuitry to be provided within or in close proximity to the image array. The design must put a premium on speed, low power consumption, and simplicity of circuit architecture. Many of the early steps in the system described above, such as the marker array, the processor, and the distributor can be readily implemented for such a system. The comparison process itself depends upon the number of alternatives patterns that need to be stored, so if the task did not demand a substantial amount of memory, the comparison and decision steps can be included as local circuit components as well.

The ability to use more than one state for the marker array allows patterns that are of interest to be separated from those that are not, as illustrated in FIGS. 10A-D. The system is not limited in this regard, as any number of states can be used to register various characteristics of the image. For example, a standard image array encodes the color at a given location in the image, and this information can be used to set the marker array into various states. With this, the pattern formed by each color can be extracted and summarized separately without a modification more complex than setting the value filter to discriminate among the options.

Although most illustrations of design and operation have derived a single distribution as the summary of the shape or pattern, one is not limited in this regard. Any number of distributions can be used in combination to specify the pattern, and some of the distributions can reflect attributes of the pattern other than distance (as illustrated in FIGS. 14A and 14B). One can apply the comparison method, e.g., sum of squared differences, to the values of all distributions as though they came from a single distribution. For example, FIG. 10B showed two patterns, one with white markers and another with black markers, and a distribution was derived for each. If one wanted to consider the two as a single pattern, one would simply use both distributions for purposes of identification or comparison, applying the comparison method to all the values in both distributions. Alternative methods are available and well known to those skilled in the art.

It was mentioned at the outset that the system can be used to evaluate marked locations within any array, including a 3D array. For such an array, a second application of the Pythagorean theorem will be needed, one that calculated distances to a convergence hub in one plane of the array (which can be at the axis of origin), and once that planar distance was found, the address component that specified depth is used to calculate the direct distance from the marked element to that hub.

Star mapping can provide an application where this system can be useful. The telescope sensor provides the address of each star on a 2D array, and the red shift of the spectrum can be used to indicate the distance from Earth of each star, and thus its position within a 3D array. A summary that was based on the 3D positioning will provide a less ambiguous summary, which can be useful for recognizing the pattern and preventing the potential for error in subsequent positioning of the telescope.

A more down-to-Earth example can be found with requirements of a navigational system. Here the disparity of range-finding equipment provides information on depth. By storing a 3D summary distribution, one can reduce the potential for incorrect identification among many similar scenes that are needed to guide the craft. Similar benefit can be achieved using a stacked set of 2D arrays, providing tandem summary distributions rather than a single distribution that was based on in-depth distances.

Except for the example given in FIGS. 10A-D, the methods have been illustrated as though a pattern of interest was itself discrete, or at least simple enough to be rendered as discrete locations on the marker array. The system is not limited to this condition. Any number of image-processing steps can take place to determine which elements in the array to mark. For example, the brightness differentials mentioned above can be further filtered to register spatial differentials and collinearity among neighboring elements, which will focus on the contours that are present. This can be delivered to the marker array with the requirement that the state of the marker can change only if a contour has been registered. This will restrict the pattern on the array to reflect only the contours that the image contained, thus eliminating any image content that failed to qualify as a contour. The pre-filtering step can assist in summarizing shape information by eliminating image content that was not related to shape. Such filtering will be especially useful where the critical contours were thin or had low contrast.

If contour filtering of this kind is done, it will often be possible to use a marker array that is of much lower resolution than the image array itself. FIGS. 13A-D illustrates the point that the summary that is needed for recognition of a shape can be accomplished using only a relatively sparse set of marked locations. One can filter the image for the presence of shape contours using a dense image array, register their locations on a marker array that was far less dense, and the resulting summary distribution will have a reasonable chance of being useful for an application requiring recognition of the shape that was displayed.

A related approach makes use of preprocessing by movement-detecting sensors. Here the sensor array has circuitry that generates a signal only if local motion has been detected as a change of contrast. If one considers only those changes that take place with great synchrony, activation of the motion detectors will most often reflect a moving object against a still background. Therefore a time-restricted "snapshot" provided by the sensors to a marker array can provide a pattern that is from a moving object, and none of the still background will intrude upon the summary that was then calculated.

One embodiment of the marker array had marker values that specified distances to a fixed hub, eliminating the use of addresses (FIGS. 6A-C). Future embodiments using local circuitry can provide alternative ways to assess the distance from markers. One possibility is to provide timed links from each element of the marker array to a tandem array of hubs. On being simultaneously polled, each marker sends a pulse to each hub, with distance being reflected in the time of travel. The signal arriving at each hub will combine the distances from marked elements as a temporal signal, thus automatically providing a distribution of the distances. One of the hubs has the lowest range of distances within its distribution, and this will be at or near the centroid of the pattern. Mutual interaction among the hubs can specify which one had the lowest range, and this will be the distribution that is sent to the comparator for storage and/or comparison.

Although the system has been illustrated and discussed assuming that the goal is to summarize minimal distance from each marker to the convergence hub, this is not a strict requirement of the system. Alternative methods for specifying distance can be used. For example, one can adopt what is generally known as a "street metric," which requires a series of steps in different directions, but nonetheless providing a route between a given marked element and the hub. The path will not be the shortest distance, but will be usable so long as a consistent rule was used to derive the path from each marked element. If the hub were at the center of the array, for example, one can even use a sum of the address values themselves to determine the path. This is a horizontal distance from the marker to the vertical axis (the X portion of the address), plus a vertical distance to reach the hub (the Y portion of the address).

Angle or arc length can also be used to specify distance. Though this is not normally done with a 2D array to specify the distance to a hub, it can provide a suitable distance measures for an array that lined a sphere (as does the retina). Here meridians provide the coordinate system, with angle of rotation quantifying the metric relationship between marked elements of the array and a central hub.

Even nontraditional coordinate systems, such a hyperbolic lattice, can be used in deriving a summary of a pattern. In fact, any formal coordinate system that quantifies the spatial relationships among elements in an array can provide distances that can be distributed into a summary.

A major goal is to provide a useful system for summarizing a pattern that is represented by a specific state of elements in a value array, with the elements manifesting that state being described as "marked." The basic system for summarizing the pattern is to derive a value that specifies the distance from each marked element to a hub, and then allocate those distances into a distribution.

Base 10 integers have been used in the examples given above, but any kind of value (or state that can be represented by a value) can be used to specify coordinate addresses, distances, or distributions.

In most examples given above, the hubs have been attributed either to the center of the array or to a centroid of the pattern. However, depending upon the coordinate system, the circuitry of the embodiment, or the application, other locations within the array can prove useful. The basic method does not require use of the center of the array or the location of the centroid.

In most examples given above, polling a given marked element has been used to provide the address or the distance to the hub. Other methods can be used to provide of the distance values.

In the examples given above, the centroid has been defined as the shortest sum of straight line distance between markers and the convergence hub. If distance is specified in some other manner, a broader definition of centroid is required. Thus for this system, the definition of a centroid is the location at which the sum of the distance measures is at a minimum.

All distributions in the examples given above are histograms, but the system can be adapted to process any form of distribution that summarizes distances from marked elements to a convergence hub.

The present method provides a summary of any shape or pattern that can be distinguished as a specified state of array elements. For an electronic array the state is the level of electrical charge (most often binary in nature, and identified as 1 and 0). This is the case for the sensor array of a digital camera, or those of an analog camera once converted to digital form. It includes values (reflecting states) provided by a scanner, or those created for display on a monitor, or stored in memory of a computer. It includes the corresponding methods for representing, storing and computing the values or states using light—so called "optical computing." The encoding method also applies to values or coded instructions for producing values that can be represented as states in an array of electronic or optical elements. The "pattern" to be summarized by the system includes all elements of an array having a given state, or values that represent the state, or coded instructions that can provide the state. The generality of the system is affirmed by the fact that one can construct and compare patterns and distributions using tools as basic as one's finger and an expanse of wet sand.

Accordingly, the scope of the methods should be determined by the appended claims and their legal equivalents, and not by the examples given.

I claim:

1. A method for summarizing a spatial pattern within an array of elements wherein marked elements of said array designate said spatial pattern and distances from a convergence hub to said marked elements are combined into a distribution that provides a summary of said spatial pattern, comprising, (a) providing an array of elements and the locations of said elements in said array according to a coordinate address system, a subset of said array of elements having a state that represents said spatial pattern, providing a label for said state, and designating said elements of said subset as said marked elements, (b) polling said elements of said array to determine the coordinate address of each of said marked elements so as to provide a set of coordinate addresses, (c) a distance processor to measure and calculate the distance of each marked element from a convergence hub, thus providing a set of distance values for said marked elements, (d) a distributor to combine said set of distance values to form a distance distribution, said distance distribution having an abscissa scale and an ordinate scale, (f) deriving a plurality of alternative distance distributions from said array, said alternative distance distributions being based on said coordinate address system, said label for said state, said polling, said measuring or calculating of distance, and said combining of said set of distance values into said distance distribution, thereby providing a plurality of alternative distance distributions which in turn provide summaries of said respective plurality of alternative spatial patterns, and (g) a distribution comparator to quantitatively compare said distance distribution with said plurality of alternative distance distributions, whereby said quantitative comparison can be used to determine degree of correspondence between said spatial pattern and said plurality of alternative spatial patterns.

2. The method of claim 1 wherein said distance processor is using the Pythagorean theorem, thereby providing a relatively simple method for specifying said distances from said marked elements to said convergence hub.

3. The method of claim 1 wherein said convergence hub is at the center of said array, thereby providing an simple and efficient method for summarizing said spatial pattern.

4. The method of claim 1, further including specifying the location of a centroid for said marked elements, and using said centroid as said convergence hub, thereby providing translation invariance of said spatial pattern and facilitates comparison of said spatial pattern irrespective of size.

5. The method of claim 1, further including specifying the locations of a plurality of additional convergence hubs, and using said plurality of additional convergence hubs to derive a set of multiple-hub distance distributions for said spatial pattern, whereby said spatial pattern is summarized from a number of vantage points.

6. The method of claim 1, further including using said coordinate addresses to specify a set of sectors, each of said sectors consisting of a subset of said elements of said array, such that said distance values provide a distribution for each sector, each distribution being designated as a sector distribution, thereby providing a set of partial summaries of said spatial pattern.

7. The method of claim 6, further including combining said sector distributions to provide a single summary distribution for said spatial pattern, thus providing a more effective summary of said spatial pattern.

8. The method of claim 7, further including a plurality of alternative patterns that are distinguished by a respective plurality of state levels, and further including providing a set of quantitative scale values to label said state levels, and combining said scale values with said distance values into a single distribution, thus providing a summary of said alternative patterns as a single pattern mixture.

9. The method of claim 1 wherein a second subset of said array of elements has a second state that represents a second spatial pattern, and further including determining said distance distributions for said elements of said second subset, thereby providing a summary for a plurality of alternative patterns within said array.

10. The method of claim 1, further including transforming the ordinate and abscissa values of said distance distribution to be proportional to said values, thus improving the comparison of said distance distribution with said alternative distance distributions.

11. The method of claim 1 wherein said quantitatively comparing said distance distribution to said plurality of alternative distance distributions is done by deriving a sum of squared differences value or a Chi Squared test value, thereby allowing correspondence of said spatial pattern to said plurality of alternative spatial patterns to be evaluated.

12. A computational system for summarizing a spatial pattern within an array of elements, wherein marked elements of said array designate said pattern and distances from marked elements to a convergence hub are combined into a distribution that provides a summary of said spatial pattern, comprising, (a) a marker array that uses a coordinate system of addresses to specify the locations of said elements, provides a label to identify said spatial pattern, and designates said elements of said spatial pattern as marked elements, (b) a polling mechanism for determining said addresses of said marked elements, (c) a processor that receives said addresses and determines a distance value for every marked element from a convergence hub, (d) a distributor that combines said set of distance values to form a distance distribution, said distance distribution having an abscissa scale and an ordinate scale, and (e) a comparator that quantitatively evaluates said distance distribution in relation to a plurality of alternative distance distributions that were derived using said marker array, said polling mechanism, said processor, and said distributor, thereby providing summaries for a plurality of alternative spatial patterns, and a quantitative basis for judging correspondence of said spatial pattern to said alternative spatial patterns.

13. The system of claim 12, further including a computer and an instructional program for said computer for performing at least some of the operations performed by said marker array, said polling mechanism, said processor, and said distributor, whereby said computer can supplement or replace any or all computations.

14. The system of claim 12 wherein said convergence hub is at the center of said array, and said polling mechanism directly provides said distance value for every marked element, thereby eliminating the requirement for a processor.

15. The system of claim 12 wherein said processor is also arranged to use said address values to determine a centroid for said marked elements, and also to use said centroid as said convergence hub, such that said distance values are calculated in relation to said centroid, thereby providing a summary of said spatial pattern that is more useful.

16. The system of claim 12, further including a filter that uses said address values to specify a set of sectors within said array, each said sector being a subset of said elements of said array, and further deriving a set of sector distributions from within each of said sectors, thereby providing a set of partial summaries of said spatial pattern.

17. The system of claim 12 wherein said array contains a plurality of alternative patterns, and further including a plurality of alternative labels that distinguish said respective plurality of alternative patterns within said array, and a filter that can discriminate among said labels, thereby providing a plurality of distributions for said plurality of alternative patterns.

18. The system of claim 12, further including a storage component for storing a plurality of said distance distributions, thus facilitating said quantitative comparisons.

19. A system for summarizing a spatial pattern within an array of elements, wherein a subset of said elements in said array represents said spatial pattern, and said elements of said subset are designated as marked elements, and for incorporating the distances of said marked elements from a convergence hub into a distribution that provides a summary of said spatial pattern, comprising,
- (a) array means for providing a an array of elements, said array means further including a labeling means for labeling a subset of said elements as constituting a spatial pattern, and designating said subset of elements as marked elements,
- (b) means for providing a coordinate system of addresses for said marked elements,
- (c) means for polling said marked elements to determine said addresses of said marked elements,
- (d) means for specifying a location in said array as a convergence hub,
- (e) means for determining a distance value for each marked element from said convergence hub,
- (f) means for combining said distance values to form a distance distribution, said distance distribution having an abscissa scale and an ordinate scale,
- (g) means for deriving a plurality of alternative distance distributions using said array, said addresses, said marked elements, said convergence hub, said means for determining said distance values of said marked element, and said means for combining said distance values, so that said plurality of alternative distance distributions provide summaries of said respective plurality of alternative spatial patterns, and
- (h) means for quantitatively comparing said distribution with said plurality of alternative distance distributions, whereby said comparison can be used to determine the degree of correspondence between said spatial pattern and said plurality of alternative spatial patterns.

20. The system of claim 19, further including means for determining a centroid for said marked elements and specifying said centroid as said convergence hub, thus providing the same said distance distribution irrespective of changes in location of said pattern.

21. The system of claim 19, further including means for selecting a plurality of additional convergence hubs and means for deriving said plurality of distance distributions from said plurality of additional convergence hubs, thereby providing summaries of said spatial pattern from more than one perspective.

22. The system of claim 19, further including a means for specifying a plurality of sectors, each said sector comprising a subset of said elements of said array, and means for deriving said plurality, of distance distributions from said sectors, thereby providing a set of partial summaries of said spatial pattern.

23. The system of claim 22, further including means for combining said plurality of distance distributions to provide a single distribution, thereby providing a more effective single summary of said spatial pattern.

24. The system of claim 22, further including means for providing a plurality of alternative patterns that are distinguished by a respective plurality of state levels, a set of quantitative scale values for labeling said state levels, and means for combining said scale values with said distance values into a single distribution, thus providing a summary of said alternative patterns as a single pattern mixture.

25. The system of claim 19, further including a second subset of said array of elements that represents a second spatial pattern, and further including determining said respective distance distributions for said elements of said second subset, thus providing a summary for a plurality of alternative patterns within said array.

26. The system of claim 19 wherein said distance distribution comprises ordinate and abscissa values and further including means for transforming said ordinate and abscissa values of said distance distribution to be proportional to said distance values, respectively, thus improving the comparison of said distance distribution with said alternative distance distributions.

27. The system of claim 19, further including means for comparing said distance distribution with said alternative distance distributions using a sum of squared differences or a Chi Square test, thereby facilitating judging the correspondence of said pattern to said alternative patterns.

28. A method for summarizing a spatial pattern within an array of elements wherein marked elements of said array designate said spatial pattern and distances from said marked elements to coordinate axes are combined into distributions that provides a summary of said spatial pattern, comprising,
- (a) providing an array of elements and the locations of said elements in said array according to a coordinate address system, a subset of said array of elements having a state that represents said spatial pattern, providing a label for said state, and designating said elements of said subset as said marked elements,
- (b) polling said elements of said array to determine a coordinate address of each of said marked elements, and designating these as marker addresses, each said marker address consisting of an X value and a Y value,
- (c) a distributor for combining said X and Y values to form a plurality of component distributions, each said component distribution having an abscissa scale and an ordinate scale,
- (d) combining said plurality of component distributions to form a summary distribution that represents said spatial pattern,
- (e) a distribution comparator for deriving a plurality of alternative summary distributions by providing said array having said coordinate address system, said label for said state, said polling, said combining into component distributions, and said combining of said component distributions into said summary distribution, thereby providing a plurality of alternative summary distributions for said respective plurality of alternative spatial patterns, and
- (f) quantitatively comparing said summary distribution with said plurality of alternative distributions, whereby said quantitative comparison can be used to determine degree of correspondence between said spatial pattern and said plurality of alternative spatial patterns.

29. The method of claim 28, further including calculating a mean centroid address comprised of the means of said X and Y values, designating these as mean X and mean Y, adjusting each marker address by subtracting said mean X from each X value to obtain an X difference, subtracting said mean Y from each Y value to obtain a Y difference, designating said X and Y differences as centroid adjusted addresses, and proceeding with said steps (b) through step (f) using said centroid adjusted addresses in the place of the corresponding marker addresses, thereby providing a summary distribution with greater utility.

30. The method of claim 28, further sorting said X and Y components into a plurality of component sets, comprised of a +X set, a −X set, a +Y set, and a −Y set, and further deriving said plurality of component distributions from each said set, and further combining said plurality of component distributions into a summary distribution for said spatial pattern, thereby providing for effective comparison to said alternative summary distributions that were derived using the same method.

31. The method of claim 28, further including transforming said ordinate scale and said abscissa scale of said summary distribution, thus improving the comparison of said summary distribution with said alternative summary distributions.

32. The method of claim 28, wherein said quantitatively comparing said summary distribution to said plurality of alternative summary distributions is done by deriving a sum of squared differences value or a Chi Squared test value, thereby allowing correspondence of said spatial pattern to said plurality of alternative spatial patterns to be evaluated.

* * * * *